(12) United States Patent
Mort et al.

(10) Patent No.: US 12,714,976 B2
(45) Date of Patent: Aug. 25, 2026

(54) FLUIDIZED BED GRANULATION AND COATING SYSTEMS AND METHODS

(71) Applicants: Purdue Research Foundation, West Lafayette, IN (US); Eli Lilly and Company, Indianapolis, IN (US)

(72) Inventors: Paul R. Mort, West Lafayette, IN (US); Line Koleilat, Cologne (FR); Jonathan Wade, Indianapolis, IN (US); Joshua Hanson, Indianapolis, IN (US)

(73) Assignees: Purdue Research Foundation, West Lafayette, IN (US); Eli Lilly and Company, Indianapolis, IN (US)

( * ) Notice: Subject to any disclaimer, the term of this patent is extended or adjusted under 35 U.S.C. 154(b) by 85 days.

(21) Appl. No.: 18/898,228

(22) Filed: Sep. 26, 2024

(65) Prior Publication Data

US 2025/0099933 A1 Mar. 27, 2025

Related U.S. Application Data

(60) Provisional application No. 63/540,622, filed on Sep. 26, 2023.

(51) Int. Cl.
*B01J 2/16* (2006.01)
*B01J 2/00* (2006.01)
*B05C 19/02* (2006.01)

(52) U.S. Cl.
CPC ................ *B01J 2/16* (2013.01); *B01J 2/006* (2013.01); *B05C 19/02* (2013.01)

(58) Field of Classification Search
None
See application file for complete search history.

(56) References Cited

U.S. PATENT DOCUMENTS 3,475,195 A * 10/1969 Pierre .................... C05B 19/00 427/427
4,309,829 A * 1/1982 Tesch ........................ F26B 3/08 34/361

(Continued)

OTHER PUBLICATIONS

N. Rasenack et al., "Micron-Size Drug Particles: Common and Novel Micronization Techniques," Pharm. Dev. Technol., vol. 9, No. 1, pp. 1-13, 2004.

(Continued)

*Primary Examiner* — Jethro M. Pence
(74) *Attorney, Agent, or Firm* — Piroozi-IP, LLC

(57) ABSTRACT

A fluidized bed granulation (FBG) system includes a pre-wetting subsystem, wherein feedstock is pre-wet to a pre-determined % value, a fluidization chamber (FC), an inlet coupled to the FC, a plenum coupled to the FC by a distributor plate having slots through which a fluidization gas is passed to the FC at a velocity and a direction, an outlet compartment coupled to the FC by a termination plate having one or more filter bags, a liquid binder system adapted to introduce a liquid binder into the FC, and an outlet configured to eject granulated product, and a plurality of sensors adapted to inform a processor executing instructions maintained on a non-transitory memory, wherein the processor using a mass, energy, and fluidization balance model is adapted to optimize the FBG system to provide the granulated product having an optimized geometric mean and geometric standard deviation between about 2.0 and about 1.0.

16 Claims, 16 Drawing Sheets

(56) References Cited

U.S. PATENT DOCUMENTS

| | | | | |
|---|---|---|---|---|
| 4,370,198 | A * | 1/1983 | Dencs | B01D 1/18 159/48.1 |
| 5,044,093 | A * | 9/1991 | Itoh | B01J 2/00 34/585 |
| 5,782,010 | A * | 7/1998 | Boersen | B01J 8/384 34/577 |
| 6,224,833 | B1 * | 5/2001 | Rall | C10G 11/18 422/139 |
| 6,711,831 | B1 * | 3/2004 | Hansen | F26B 3/12 34/372 |
| 6,740,632 | B1 * | 5/2004 | Jacob | C11D 11/02 23/313 FB |
| 7,147,717 | B2 * | 12/2006 | Bender | F26B 3/0926 118/DIG. 5 |
| 7,182,282 | B2 * | 2/2007 | Bedetti | B01J 2/16 239/662 |
| 7,563,325 | B2 * | 7/2009 | Bender | B05C 19/02 118/62 |
| 9,527,104 | B2 * | 12/2016 | Ledoux | B01J 2/16 |
| 9,649,609 | B2 * | 5/2017 | Alt | A23K 10/12 |
| 10,279,359 | B2 * | 5/2019 | Ackerman | B01J 2/02 |
| 10,883,762 | B1 * | 1/2021 | Velazquez-Figueroa | F26B 3/08 |
| 11,077,064 | B2 * | 8/2021 | Thies | B01J 2/16 |
| 11,576,869 | B2 * | 2/2023 | Thies | A61K 9/2893 |
| 2003/0037415 | A1 * | 2/2003 | Alt | C09C 1/3036 502/9 |
| 2008/0305420 | A1 * | 12/2008 | Kinoshita | B05B 7/0433 430/118.5 |
| 2011/0067735 | A1 | 3/2011 | Mort, III et al. | |
| 2021/0053884 | A1 * | 2/2021 | Franzrahe | C05C 9/005 |

OTHER PUBLICATIONS

K. R. Vandana et al., Y. Prasanna Raju, V. Harini Chowdary, M. Sushma, and N. Vijay Kumar, "An overview on in situ micronization technique—An emerging novel concept in advanced drug delivery," Saudi Pharm. J. SPJ, vol. 22, No. 4, p. 283, 2014.

J. T. Joshi, "A Review on Micronization Techniques," J. Pharm. Sci. Technol., vol. 3, No. 7, pp. 651-681, 2011.

H. G. Kristensen et al., "Granulation: A review on pharmaceutical wet-granulation," Drug Dev. Ind. Pharm., vol. 13, No. 4-5, pp. 803-872, 1987.

O. Molerus, "Interpretation of Geldart's type A, B, C and D powders by taking into account interparticle cohesion forces," Powder Technol., vol. 33, No. 1, pp. 81-87, 1982.

D. Geldart, "Types of gas fluidization," Powder Technol., vol. 7, No. 5, pp. 285-292, 1973.

E. R. Monazam et al., "Elutriation of fines from binary particle mixtures in bubbling fluidized bed cold model," Powder Technol., vol. 305, pp. 340-346, 2017.

D. S. Kumar et al., "Pre-nucleation in high-shear wet granulation," Powder Technol., vol. 437, p. 24, 119522, Mar. 2024.

K. K. Moravkar, T. M. Ali, J. N. Pawar, and P. D. Amin, "Application of moisture activated dry granulation (MADG) process to develop high dose immediate release (IR) formulations," Adv. Powder Technol., vol. 28, No. 4, pp. 1270-1280, Apr. 2017.

I. Nikolakakis et al., "Water retention and drainage in different brands of microcrystalline cellulose: Effect of measuring conditions," Eur. J. Pharm. Biopharm., vol. 63, No. 3, pp. 278-287, Jul. 2006.

P. M. Monsanto et al., "Formulation in a drop—Templated granulation and compaction analysis," Powder Technol., vol. 438, p. 119611, Apr. 2024.

L. Koleilat et al., "Flow field analysis of a toroidal flow fluidized bed granulator," Chem. Eng. Res. Des., vol. 208, pp. 359-368, Aug. 2024.

J. A. Hersey, "Ordered mixing: A new concept in powder mixing practice," Powder Technol., vol. 11, No. 1, pp. 41-44, Jan. 1975.

I. C. Kemp et al., "Scale-Up, Optimization, and Control of Industrial Batch Fluidized Bed Dryers Using Multilevel Theoretical Models," Dry. Technol., vol. 28, No. 5, pp. 710-722, May 2010.

B. J. Ennis et al., "A microlevel-based characterization of granulation phenomena," Powder Technol., vol. 65, No. 1-3, pp. 257-272, 1991.

P. Mort, "Analysis and graphical representation of particle size distributions," Powder Technol., vol. 420, p. 118100, Apr. 2023.

Unknown, ISO 9276-6, Representation of results of particle size analysis—Part 6: Descriptive and quantitative representation of particle shape and morphology. Technical Committee ISO/TC 24. International Organization for Standardization, 2008.

K. P. Hapgood et al., "Dimensionless spray flux in wet granulation: Monte-Carlo simulations and experimental validation," Powder Technol., vol. 141, No. 1, pp. 20-30, 2004.

R. Lagare et al., "Developing a Virtual Flowability Sensor for Monitoring a Pharmaceutical Dry Granulation Line," J. Pharm. Sci., Jan. 2023.

D. Kunii et al., "The Dense Bed: Distributors, Gas Jets, and Pumping Power," in Fluidization Engineering, Elsevier, 1991, pp. 95-113.

I. C. Kemp et al., "Methods for Processing Experimental Drying Kinetics Data," Dry. Technol., vol. 19, No. 1, pp. 15-34, 2001.

D. Geldart et al., "The design of distributors for gas-fluidized beds," Powder Technol., vol. 42, No. 1, pp. 67-78, 1985.

* cited by examiner $R_{specific} = 0.287\ KJ/Kg \cdot K$ $AH_{air\_in} = RH_{air\_in} \cdot P_{sat}(T)/(101.3 \cdot p_1),$ $P_{sat}(T) = 0.61078 \cdot \exp(17.27 \cdot T/(T+237.3))$ $C_{d,0} = 0.15$ and $m = 0.26$ $Re_{slot} = \rho_{g\_plate} \cdot U_s \cdot w/\mu_{g\_plate}$ B is percent by weight of binder solids to water content in the liquid binder $m_{bs}$ is mass of binder solids calculated by $m_{bs}|_t = \sum_0^t (B \cdot \dot{m}_s) \Delta t$ $d_{gV}$, µm

400

100

50

1

0

-1

λ

0 300 600 900 1200 1500 1800 elapsed time, s

FLUIDIZED BED GRANULATION AND COATING SYSTEMS AND METHODS

CROSS-REFERENCE TO RELATED APPLICATIONS

The present non-provisional patent application is related to and claims the priority benefit of U.S. Provisional Patent Application Ser. 63/540,622, filed Sep. 26, 2023, the contents of which are hereby incorporated by reference in its entirety into the present disclosure.

STATEMENT REGARDING GOVERNMENT FUNDING

None.

TECHNICAL FIELD

The present application relates to material granulation, and specifically to fluidized bed granulation utilizing staged binder addition and dynamic monitoring and control of the fluid-bed input parameters.

BACKGROUND

This section introduces aspects that may help facilitate a better understanding of the disclosure. Accordingly, these statements are to be read in this light and are not to be understood as admissions about what is or is not prior art.

Fluidized bed granulation (FBG) is a process commonly used in the pharmaceutical, food, and chemical industries to produce granules or aggregates of fine powder materials. It typically involves suspending and agitating the powder particles in a stream of gas (e.g., air) to create a fluidized bed, where the particles behave like a fluid. Within this fluidized bed, liquid binder or solution is introduced to the particles, causing them to agglomerate and form larger granules.

More specifically, in a dedicated chamber, the fine powder particles are typically loaded and positioned above a perforated plate or distributor. Subsequently, a flow of air or another gas is introduced from below the plate. This upward gas flow suspends and fluidizes the powder particles. As the powder particles are in this fluidized state, a liquid binder or solution is sprayed onto them using specialized nozzles or spray guns. The nature of the binder can vary and may include water, organic solvents, or a combination of substances, depending on the specific requirements and the material being processed. As the liquid binder is sprayed onto the fluidized powder particles, it wets their surfaces, prompting them to adhere together and form small aggregates or granules. The size and density of these granules can be precisely controlled by adjusting factors such as the rate of binder flow, the spray pattern, and the temperature within the fluidized bed. Subsequent to granulation, the wet granules are allowed to dry within the fluidized bed. The continued flow of warm air or gas through the bed facilitates the evaporation of moisture from the granules.

In some applications, a protective or functional coating may be applied to the granules during or after granulation. This is achieved by spraying a coating solution onto the granules while they remain within the fluidized bed. Once the granules have achieved the desired size, density, and moisture content, they are collected for further processing. This may involve additional drying, sieving, or blending steps to ensure uniformity and quality of the final product.

However, present FBG systems suffer from lack of controllability insofar as geometric mean of granule size and geometric standard deviation of the granule size and granule shape.

Therefore, there is an unmet need for a novel approach to improve granulation in an FBG system which provides improved control over geometric mean of granule size and geometric standard deviation of the granule size and granule shape.

SUMMARY

A fluidized bed granulation (FBG) system is disclosed. The system includes a pre-wetting subsystem, wherein the feedstock is pre-wet in the pre-wetting subsystem to a predetermined % value, a fluidization chamber, an inlet coupled to the fluidization chamber and adapted to receive the pre-wet feedstock to be granulated, a plenum coupled to the fluidization chamber by a distributor plate having slots through which a fluidization gas is passed to the fluidization chamber, said gas having a fluidization velocity including a fluidization direction, an outlet compartment coupled to the fluidization chamber by a termination plate having one or more filter bags whereby gases are allowed to escape the fluidization chamber while the pre-wet feedstock is held back on surfaces of the one or more filter bags, a liquid binder system adapted to introduce a liquid binder into the fluidization chamber through nozzles to spray the liquid binder in substantially same or opposite direction as the fluidization direction, and an outlet configured to eject granulated product with granules having a geometric mean and a geometric standard deviation. The system further includes a plurality of sensors adapted to inform a processor executing instructions maintained on a non-transitory memory, wherein the processor using a mass, energy, and fluidization balance model is adapted to optimize the FBG system to provide the granulated product having an optimized geometric mean for granule size at an optimized geometric standard deviation. The ejected granules have a geometric granule size and shape distribution of between about 2.0 and about 1.0

A method of granulating a feedstock in form of a powder, using a fluidized bed granulation (FBG) system is also disclosed. The method includes pre-wetting a feedstock in powder form by a pre-wetting subsystem to a predetermined % value, and transferring the pre-wet feedstock from a feedstock vessel to a fluidization chamber through an inlet coupled to the fluidization chamber. The method further includes applying a fluidization gas through a plenum coupled to the fluidization chamber by a distributor plate having slots through which the fluidization gas is passed to the fluidization chamber at a fluidization velocity including a fluidization direction the fluidization gas exiting an outlet compartment coupled to the fluidization chamber by a termination plate having one or more filter bags whereby gases are allowed to escape the fluidization chamber while the pre-wet feedstock is held back on surfaces of the one or more filter bags, applying a liquid binder by a liquid binder system into the fluidization chamber through nozzles to spray the liquid binder in substantially same or opposite direction as the fluidization direction, and ejecting granulated product through an outlet having a geometric mean and a geometric standard deviation. The method also includes sensing fluidization parameters by a plurality of sensors to inform a processor executing instructions maintained on a non-transitory memory, wherein the processor using a mass, energy, and fluidization balance model is adapted to optimize the FBG system to provide the granulated product having an optimized geometric mean for granule size at an optimized geometric standard deviation and granule shape.

BRIEF DESCRIPTION OF FIGURES

FIGS. 10A, 10B, and 10C, respectively) all with 10% PW with increasing BB, and FIG. 10D providing results for 5% PW with intermediate BB.

DETAILED DESCRIPTION

Figure 1A:
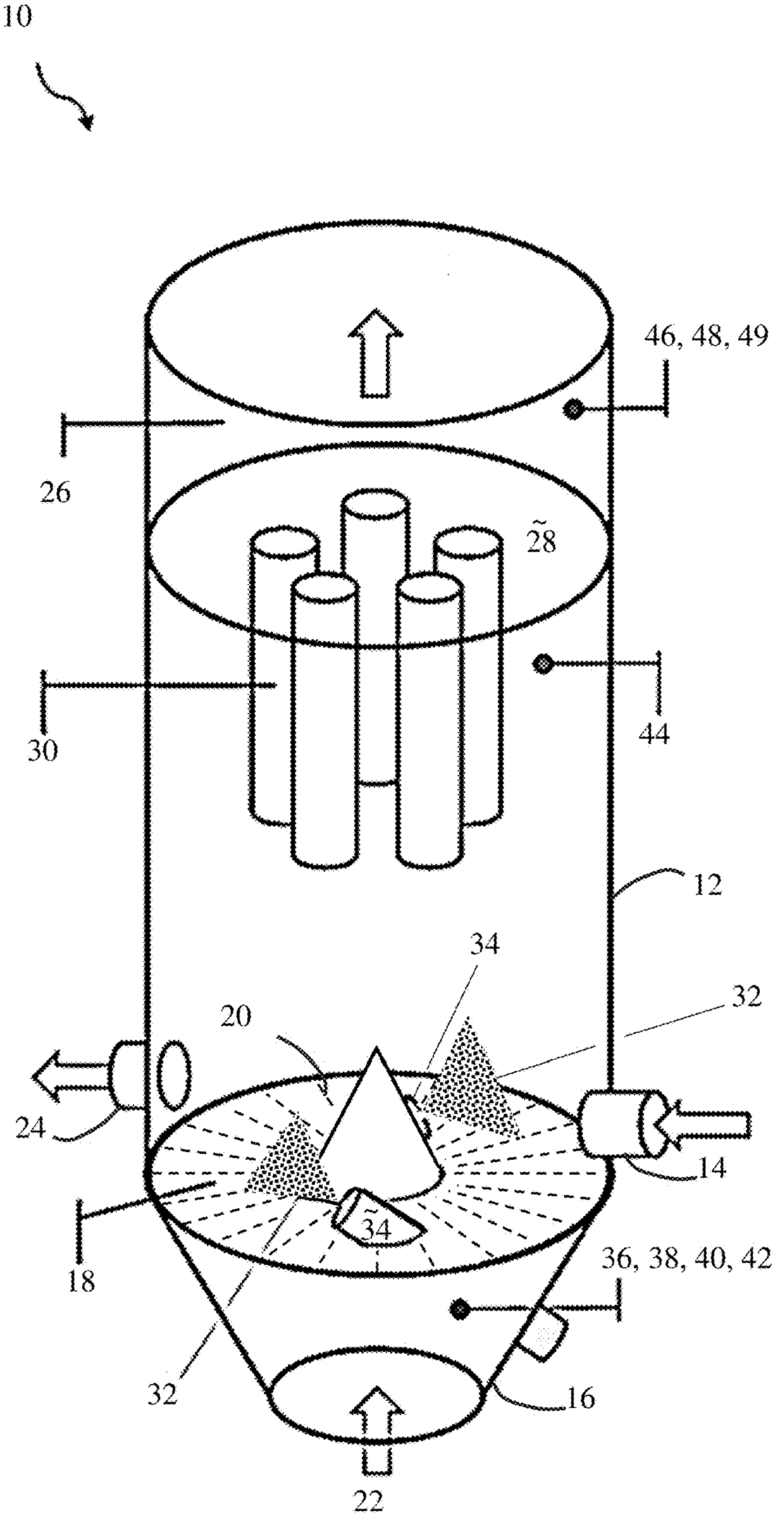
FIG. 1A depicts a schematic view of a fluidized bed granulation (FBG) and coating system having a distributor plate with inclined slots, showing one exemplary process flow of a granulation procedure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term “about” can allow for a degree of variability in a value or range, for example, within 10%, within 5%, or within 1% of a stated value or of a stated limit of a range.

In the present disclosure, the term “substantially” can allow for a degree of variability in a value or range, for example, within 90%, within 95%, or within 99% of a stated value or of a stated limit of a range.

A novel approach is presented herein to improve granulation in a Fluidized bed granulation (FBG) system which provides improved control over geometric mean of granule size and geometric standard deviation of the granule size and granule shape. A modified FBG system is disclosed. Towards this end, the present disclosure describes the modified FBG system having a plurality of sensors which when operated provide signals associated with a plurality of operational parameters that can be used by a processing system having at least one processor in a processing system executing software residing on a non-transient memory, which said execution of said software allows for optimization of the FBG process to achieve optimized geometric mean of granule size and geometric standard deviation of the granule size and granule shape. Additionally, the present disclosure provides an optional variation of the FBG process whereby feedstock is pre-wetted prior to entry into the FBG system to further assist with the granulation process.

The FBG system of the present disclosure can be optimized to achieve optimized geometric mean of granule size as well as geometric standard deviation of the granule size and granule shape. Generally, granule size is controlled by balancing growth (e.g., via wet binders) and drying in a fluidized flow field where feedstock powders and atomized binder are combined. In the case of granulation, accumulation of excess moisture during the binder spray-on is important for controlling granule growth having consistent structure and narrow size distribution. Fluidized bed coating (FBC) processes balance the addition of a coating solution with its drying, providing sufficient surface wetting to achieve uniform coating, yet minimizing excess moisture as a means to avoid agglomeration. Both FBG and FBC depend on having precise control of the flow field where the spray combines with particulates.

In order to achieve these goals, the present disclosure provides a model based on i) mass, ii) energy, and iii) fluidization balance. Mass balance represents an in-process modeling approach which uses a measure of airflow (volumetric measurements converted to mass using air density which is a function of temperature, pressure, and relative humidity), as well as binder spray (i.e., how much water) is provided in the binder sprayed within the fluidization chamber, thus building a model that is based on input mass vs. output mass. For the mass balance, pressure sensors are used in the inlet air within a plenum, in the fluidization chamber, and in the air outlet compartment. Additionally, there are relative humidity sensors in the plenum and the outlet compartment to measure relative humidity of the inlet air and the outlet air, each of which is converted to absolute humidity for use in the mass balance. There also is a volumetric airflow sensor and thermocouple in the plenum to measure how much air is added at what temperature; the thermocouple reading is used to convert volumetric airflow to mass via density, as discussed in much greater detail herein.

Next, the model uses an energy balance based on energy in vs. energy out which can be used as a predictive model in addition to being used as an in-process tool. The energy balance uses airflow, temperature, how much water in binder, enthalpy of vaporization to provide a duplicate method to mass balance to model the FBG process. For energy balance, the temperature sensor in the plenum is used as well a second temperature sensor disposed directly above a distributor plate separating the plenum from the fluidization chamber, discussed further below, as well as a temperature sensor in the outlet compartment. There are thermal losses, e.g., conductive losses through walls of the fluidization chamber, which affect the energy balance. In the specific instance of the FBG system used herein (i.e., the Syntegon SL2 system), most of the losses occur between the measured inlet temperature by the plenum temperature sensor and the distributor plate, and can be modeled empirically as a function of temperature and airflow. These losses may be accounted for, however, thus providing an opportunity to further finetune the overall model during process based on actual sensor data (i.e., the model may be finetuned using the sensor data as feedback data when actual data shows an error as compared to modeled data so that the model is continuously improved in real-time).

Finally, the model uses a fluidization balance which can be written as the ratio of pressure drops: $\Delta P_{plate}/\Delta P_{bed}$ which refers to the ratio of pressure differential across the distributor plate vs. the pressure differential across the fluidization chamber. Accordingly, the pressure sensors provided (i.e., 1: the pressure sensor in the plenum, 2: the pressure sensor in the fluidization chamber near a termination plate separating the outlet compartment from the fluidization chamber, and 3: the pressure sensor in the outlet compartment) provide a measure of $\Delta P_{plate}$ and $\Delta P_{bed}$. $\Delta P_{plate}$ can be modeled empirically using an empty fluidization chamber. Subtracting the $\Delta P_{plate}$ from the total pressure drop across the pressure sensors in the plenum and the second pressure sensor at the top of the fluidization chamber provides $\Delta P_{bed}$. $\Delta P_{bed}$ can be related to the weight of the product in the bed, assuming no build up on filter bags extending downward into the fluidization chamber from the termination plate (configured to allow air to pass through but prevent feedstock from passing from the fluidization chamber to the outlet compartment), and/or walls of the fluidization chamber. The difference between the $\Delta P_{bed}$ (i.e., $\Delta P_{total}-\Delta P_{plate}$, where $\Delta P_{total}$ is the pressure difference across the pressure sensor in the plenum and the pressure sensor atop the fluidization chamber) and the weight (in mg) converted from a measure of pressure informs of 1) departure from ideal fluidization (e.g., elutriation of feedstock on the filter bags)—this issue is undesired for uniform granulation thus resulting in excessive variation and thus resulting in excessive geometric standard deviation and granule shape (where reducing said variation is a goal of the present disclosure), and 2) adjustment due to wall friction in a toroidal-flow bed of the fluidization chamber. Two approaches are presented to account for these shortcomings. First, a pre-wetting process is disclosed herein by a pre-wetting subsystem whereby dry feedstock in form of powder is first pre-wetted to a predetermined % before entering the fluidization chamber, which as will be shown provides a significant reduction in elutriation of feedstock on the filter bags. The second approach which is again based on finetuning the model can be accomplished when the model output is different than sensor data, representing model error, resulting from wall friction as a function of granule growth which can be used to fine-tune the model in-process (i.e. real-time).

Referring to FIG. 1A, an FBG system 10 according to the present disclosure is shown. The FBG system 10 includes a feedstock vessel (not shown) adapted to hold powder feedstock (e.g., feedstock in the size range of micrometers) to be granulated. The system 10 further includes a fluidization chamber 12, wherein the feedstock powder is fluidized with air and a binder into granules. The FBG system 10 also includes an inlet 14 coupled to the fluidization chamber which is adapted to receive the feedstock from the feedstock vessel (not shown) and pass the feedstock to be granulated to the fluidization chamber 12. The FBG system 10 also includes a plenum 16 coupled to the fluidization chamber by a distributor plate 18 having slotted openings 20 adapted to pass forced gas from gas inlet 22 of the plenum 16 into the fluidization chamber 12 thereby generating a toroidal gaseous movement within the fluidization chamber 12. The FBG system 10 also includes an outlet 24 wherein granulated product with a geometric mean size and a geometric distribution of size and granule shape is ejected from the fluidization chamber 12. Additionally, an outlet compartment 26 is coupled to the fluidization chamber by a termination plate 28 having one or more filter bags 30 extending into the fluidization chamber 12, whereby gases are allowed to escape the fluidization chamber 12 while the feedstock (powderized or granulized product) are held back on surfaces of the one or more filter bags 30. A liquid binder system adapted to introduce a liquid binder 32 into the fluidization chamber 12 through nozzles 34 disposed atop the distributor plate 18. The system also includes a plurality of sensors. These sensors include an inlet airflow sensor 36 disposed in the plenum 16 and which is adapted to provide an airflow signal corresponding to amount of gas passing by (Vin). It should be appreciated that while from henceforth instead of mentioning a gas the fluidization material, air is mentioned henceforth, however, air can be replaced with other gases, e.g., inert gases, depending on the product fluidization needs, as would be known to a person having ordinary skill in the art. Thus, any time the term "air" is used, the term can be exchanged with "gas." Next, the plurality of sensors include a first relative humidity sensor 38 disposed in the plenum 16 and which is adapted to provide a signal corresponding to a measure of relative humidity of air ($RH_{air\_in}$). Next, the plurality of sensors include a first pressure sensor 40 disposed in the plenum 16 and which is adapted to provide a signal corresponding to a measure of inlet pressure of air ($P_1$). Next, the plurality of sensors include a first temperature sensor 42 disposed in the plenum 16 and which is adapted to provide a signal corresponding to a measure of inlet temperature of air ($T_{in}$). Next, the plurality of sensors include a second pressure sensor 44 disposed in the fluidization chamber 12 near the termination plate 28 and which is adapted to provide a second pressure signal corresponding to pressure at said location ($P_2$). Next, the plurality of sensors include a third pressure sensor 46 disposed in the outlet compartment 26 and which is adapted to provide a third pressure signal corresponding to pressure at said location ($P_3$). Next, the plurality of sensors include a mass sensor disposed in the liquid binder system (not shown) and which is adapted to provide a signal corresponding to rate of mass of the liquid binder 32 sprayed through the nozzles 34 ($\dot{m}_s$). Next, the plurality of sensors include a second temperature sensor 48 disposed in the outlet compartment 26 and which is adapted to provide a signal corresponding to a measure of outlet temperature of air ($T_{out}$). Next, the plurality of sensors include a second relative humidity sensor 49 disposed in the outlet compartment 26 and which is adapted to provide a signal corresponding to a measure of outlet relative humidity of air ($RH_{air-out}$). The sensors discussed above, are adapted to inform a processor executing instructions maintained on a non-transitory memory of mass and energy information coming into and out of the fluidization chamber 12, wherein the processor using a mass balance model is adapted to optimize the FBG system to provide the granulized product with an optimized geometric mean granule size having an optimized geometric standard deviation and granule shape.

In the system of the present disclosure, a Xelum R&D Fluidized Bed Granulation and Coating System manufactured by Syntegon Technology GmbH of Schopfheim, Germany, was used having a DISKJET® distributor plate with inclined slots that generate a toroidal airflow field. Powder is fluidized by air that continuously passes through the inclined slots in the distributor plate, and a liquid binder or coating solution is added through bottom-spray nozzles, which may be oriented at or near 450 relative to the bottom surface, with a spray trajectory similar to the toroidal air flow. The toroidal flow is stabilized by a conical centerpiece attached to the distributor. Once the desired granule growth and/or coating is achieved, spraying stops and fluidization air flow continues to dry the product to an endpoint objective before discharging the product.

Figure 1B:
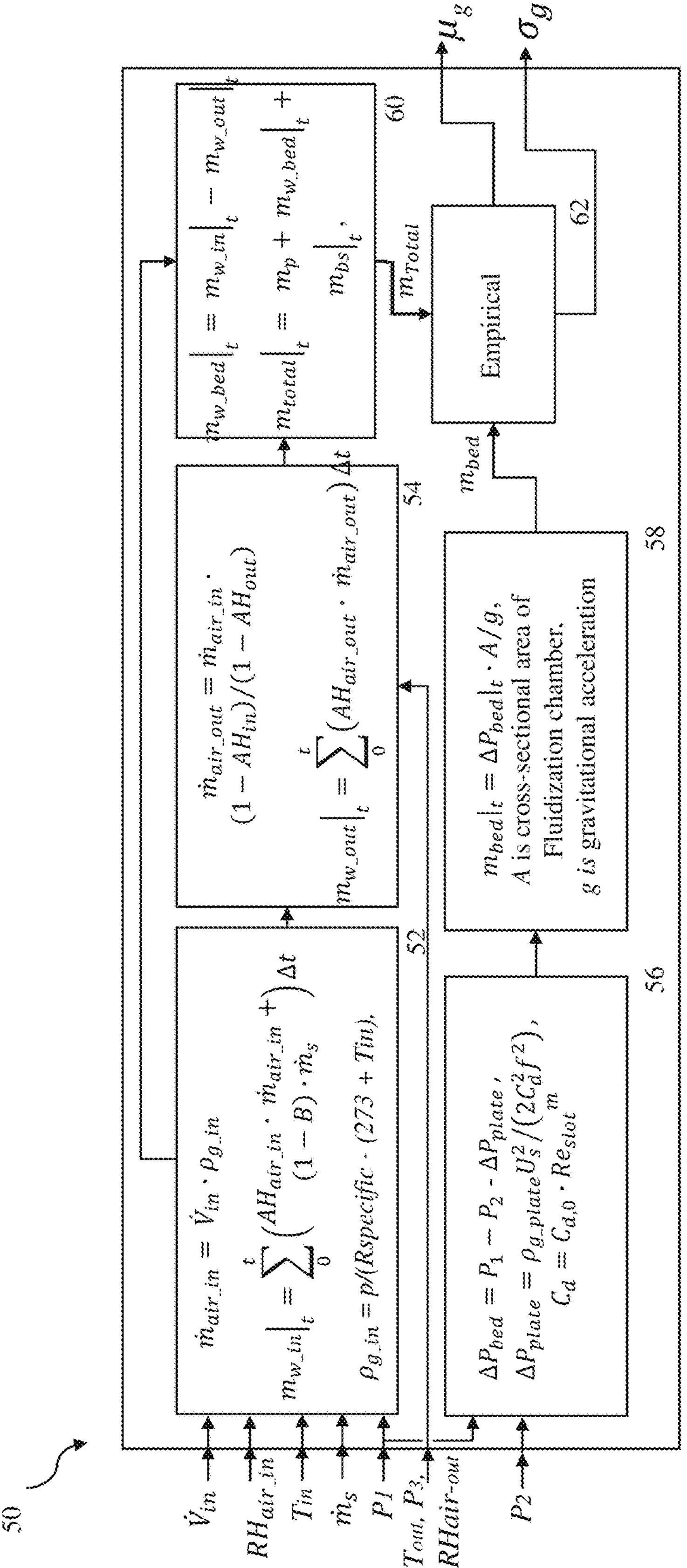
FIG. 1B depicts a block diagram showing the process steps in optimizing the FBG system by receiving a plurality of sensor signals and controlling a plurality of operational parameters to establish improved control over geometric mean of granule size and geometric standard deviation of the granule size and granule shape.

Referring to FIG. 1B, a high-level block diagram representing optimization process 50, according to the present disclosure, is provided. As discussed above, sensors signals (i.e., signals from the inlet airflow sensor 36 ($\dot{V}_{in}$), the first relative humidity sensor 38 ($RH_{air\_in}$), the first pressure sensor 40 ($P_1$), the first temperature sensor 42 ($T_{in}$), the second pressure sensor 44 ($P_2$), the mass sensor disposed in the liquid binder system (not shown) ($\dot{m}_s$), the second temperature sensor 48 ($T_{out}$), and the second relative humidity sensor 49 ($RH_{air-out}$)) are provided to a processor of a processing system to optimize the operation of the FBG system, according to the present disclosure. Specifically, signals from the inlet airflow sensor 36 ($\dot{V}_{in}$), the first relative humidity sensor 38 ($RH_{air\_in}$), the first pressure sensor 40 ($P_1$), the first temperature sensor 42 ($T_{in}$), and the mass sensor disposed in the liquid binder system (not shown) ($\dot{m}_s$) are provided to block 52 of the optimization process 50 which converts volumetric data associated with incoming air (i.e., $\dot{V}_{in}$) to mass (i.e., $\dot{m}_{air\_in}$), and further calculates rate of mass of incoming water in the inlet air (i.e., $m_{w\_in}$) based on:

$$\dot{m}_{air\_in} = \dot{V}_{in} \cdot \rho_{g\_in},$$

wherein $\rho_{g\_in}$ is the density of air at $T_{in}$ calculated based on:

$$\rho_{g\_in} = p/(Rspecific \cdot (273 + Tin)),$$

and where p is the pressure in the plenum in atmosphere, $T_{in}$ is air temperature in the plenum in ° C., where $R_{specific}$=0.287 KJ/Kg° K., $$m_{w\_in}|_t = \sum_0^t (AH_{air\_in} \cdot \dot{m}_{air\_in} + (1 - B) \cdot \dot{m}_{bin})\Delta t,$$

where B is percent by weight of binder solids to water content in the liquid binder, $AH_{air\_in}$ is the absolute humidity of the inlet air is calculated based on:

$$AH_{air\_in} = RH_{air\_in} \cdot P_{sat}(T)/(101.3 \cdot p_1),$$

where $RH_{air\_in}$ is fractional relative humidity measured with the associated sensor, $P_{sat}(T)$ is water vapor saturation pressure in air at temperature T (° C.) based on one of a plurality of approximation including:

$P_{sat}(T) \approx 0.61078 \cdot \exp(17.27 \cdot T/(T+237.3))$. It should be noted that in the calculation above related to $m_{w\_in}|_t$ the water content added by pre-wetting, which is an embodiment of the present disclosure is not accounted for. However, that water content can be added as another term in the $m_{w\_in}|_t$ equation, provided above, as a standalone term, as would be known to a person having ordinary skill in the art, based on % pre-wetting being added to the dry feedstock. In the energy balance presented below dealing with enthalpy, the input water content associated with pre-wetting is accounted for.

Next, the calculated $m_{w\_in}$ is used in block 54 to first calculate hair out which is mass and $AH_{air\_out}$ is absolute humidity of the outlet air calculated for each time increment, Δt, with the outlet mass flow based on:

$$\dot{m}_{air\_out} = \dot{m}_{air\_in} \cdot (1 - AH_{in})/(1 - AH_{air\_out}),$$

where $AH_{air\_out}$ is outlet air absolute humidity determined based on:

$$AH_{air\_out} = RH_{air\_out} \cdot P_{sat}(T) / (101.3 \cdot p_{out}),$$

where $RH_{air\_out}$ is fractional relative humidity measured with associated humidity sensor, $p_{out}$ is the outlet air pressure in units of atmospheres, measured by P3, $P_{sat}(T)$ is the water vapor saturation pressure defined by:

$$P_{sat}(T) \approx 0.61078 \cdot \exp(17.27 \cdot T / (T + 237.3)),$$

where mass evaporation rate is calculated based on:

$$\dot{m}_{evap} = \dot{m}_{air\_out} - \dot{m}_{air\_in}.$$

From the above, cumulative mass of water removed from the granulation system at elapsed time t is calculated in block 54, based on:

$$m_{w\_out}|_t = \sum_0^t (AH_{air\_out} \cdot \dot{m}_{air\_out})\Delta t.$$

Next, a pressure drop across the distributor plate, $\Delta P_{plate}$, is calibrated in block 56 based on collecting pressure data with an otherwise empty fluidization chamber as a function of airflow and temperature expressed by:

$$\Delta P_{plate} = \rho_{g\_plate} U_s^2 / (2C_d^2 f^2),$$

where $\rho_{g\_plate}$ is air density evaluated using pressure and temperature data in the close vicinity of the distributor plate, similar to discussion above with respect to $\rho_{g\_in}$, f is fractional open area due to the slots of the distributor plate, $U_s$ is a measure of superficial velocity of air calculated based on:

$$U_s = \dot{m}_{air\_in} / (A \cdot \rho_{g\_plate}),$$

where A is a cross-sectional area of the fluidization compartment near the distributor plate, and $C_d$ is a distributor plate discharge coefficient calculated based on:

$$C_d = C_{d,0} \cdot Re_{slot}^m,$$

where $C_{d,0}$ and m are fit parameters modeled as a function of Reynolds Number of gas flow through the distributor plate, where the Reynolds number is calculated based on:

$$Re_{slot} = \rho_{g\_plate} \cdot U_s \cdot w / \mu_{g\_plate},$$

wherein w is characteristic size (i.e., width, in units of length) of the slots in the distributor plate, and $\mu_{g\_plate}$ is dynamic viscosity of the gas evaluated at temperature and pressure conditions, as known to a person having ordinary skill in the art, evaluated in close proximity to the distributor plate.

Actively-fluidized mass of material in the fluidization chamber ($m_{bed}$) is calculated in block 58 based on:

$$m_{bed}|_t = \Delta P_{bed}|_t \cdot A / g,$$

$$\text{where } \Delta P_{bed}|_t = (P_1 - P_2)|_t - \Delta P_{plate}|_t,$$

where $(P_1-P_2)|_t$ is measured pressure drop at elapsed time t based on the associated sensors, and g is the gravitational acceleration.

Instantaneous mass of moisture associated with fluidized product at elapsed time t, and the mass in the fluidization chamber, respectively, are calculated in block 60 based on:

$$m_{w\_bed}|_t = m_{w\_in}|_t - m_{w\_out}|_t,$$

$$m_{total}|_t = m_p + m_{w\_bed}|_t + m_{bs}|_t,$$

where $m_p$ is mass of the feedstock, and $m_{bs}$ is mass of binder solids calculated as:

$$m_{bs}|_t = \sum_0^t (B \cdot \dot{m}_s)\Delta t.$$

With $m_{total}$ calculated in blocks 60, and $m_{bed}$ calculated in block 58, the processor optimizes $m_{bed}$ and $m_{total}$ based on a plurality of process parameters over elapsed cycle time, t, to be within a predetermined threshold, based on deterministic values of $\dot{V}_{in}$, $RH_{air\_in}$, $P_1$, $T_{in}$, B, and is, each chosen with associated predetermined range of values. The two quantities ($m_{bed}$ and $m_{total}$) are compared based on an empirical relationship as provided in block 62. If the difference between $m_{total}$ and $m_{bed}$ are within a predetermined threshold, the process is deemed to have produced an optimized geometric mean ($\mu_g$) for product granulation size defined by:

$$\mu_g = \left(\prod_{i=1,N}^{N} a_i\right)^{\frac{1}{N}},$$

where $a_i$ represents sizes of individual granule, and a geometric standard deviation, $\sigma_g$, defined by:

$$\sigma_g = e^{\sqrt{\frac{1}{N}\sum_{i=1}^{N}\left(ln\frac{a_i}{\mu_g}\right)^2}}.$$

Thus, optimization according to the present disclosure includes varying adjustable parameters including inlet air parameters sensed by the above-described sensors producing signals such as $\dot{V}_{in}$, $RH_{air\_in}$, $P_1$, $T_{in}$, and adjusting binder parameters based on B and $\dot{m}_s$, and measuring inlet air parameters via said sensor generating said signals, outlet air parameters, including those sensed by the above-described sensors producing signals such as $P_3$, $T_{out}$, $RH_{air\_out}$, as well as sensors in the granulation chamber measuring signals such as $P_2$. A variety of optimization algorithms each known by a person having ordinary skill in the art can be applied to achieve a close match between $m_{bed}$ and $m_{total}$ within a predetermined range. In addition, pre-wetting parameters, further described below can also be used in the optimization. Pre-wetting represents an alternative embodiment as described below whereby dry feedstock in the form of powder is pre-wet prior to entering the fluidization chamber through the inlet. Pre-wetting parameters includes amount of pre-wetting (e.g., by using distilled water, and how much distilled water) applied to dry feedstock in the form of powder and duration of wetting, as well as substance of pre-wetting (e.g., distilled water or another wetting agent). These parameters can also be used in conjunction with the overall optimization process, or in a standalone optimization process.

The processor is configured to optimize $m_{bed}$ and $m_{total}$ over course of process elapsed cycle time, t, to be below a predetermined threshold, based on deterministic values of % pre-wetting, $\dot{V}_{in}$, $RH_{air\_in}$, $P_1$, $T_{in}$, B, and $\dot{m}_s$, each chosen within an associated predetermined range of values, wherein $\tau_0$ is time at start of the liquid binder addition and $\tau_1$ is time at end of the liquid binder addition, with $\tau_n$ representing time at fractional binder addition, n, wherein $(\Sigma_{\tau_n}^{\tau_1}/(m_{bed}/m_{total})\Delta t/(\tau_1-\tau_n))>\text{Target}_n$ for time range of $\tau_n \leq t \leq \tau_1$, where $\text{Target}_n$ is one of 0.5, 0.6, 0.7, 0.8, or 0.9 for $\tau_n$ of one of 0.25 or 0.5.

Figure 1C:
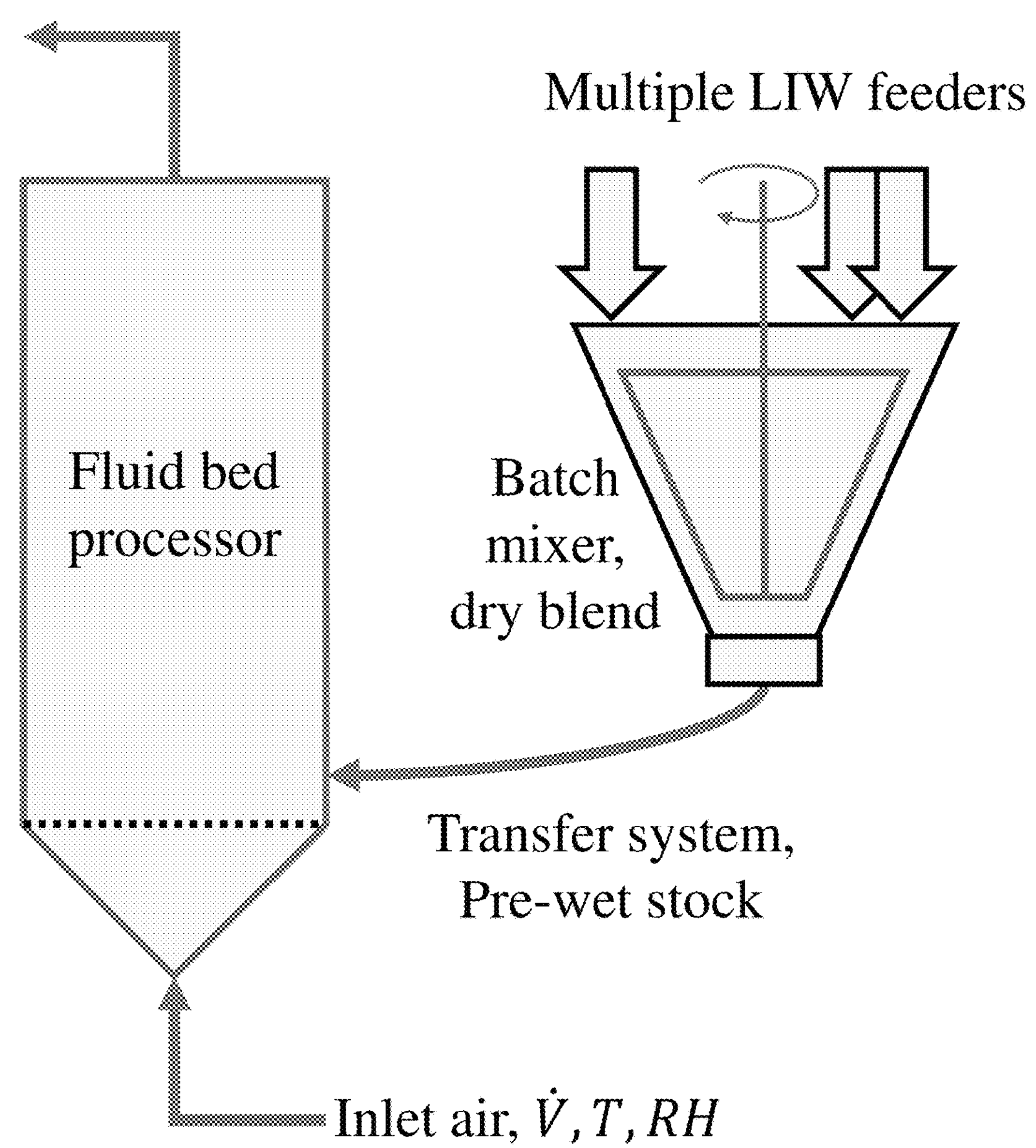
FIG. 1C is a schematic of an alternative embodiment, where the feedstock is pre-wet prior to being introduced to the fluidization chamber.

One challenge with a traditional FBG system, is the accumulation of particles (i.e., granulized product or in-process of granulation feedstock) on the filter bags. In order to release these particles, traditionally a blowback pressure is applied to the filter bags to cause the release of said particles. Another way known in the prior art is to apply ultrasonic pulses to the filter bags in order to release the particles. However, all these approaches result in introduction of complicated machines. Without some intervention, results later shown in FIG. 9A, discussed below, show undesired results where $m_{total}$ and $m_{bed}$ are far apart, representing a less than desired solution leading to a broad distribution of granule sizes and lower yield. One approach to avoid accumulation of particles on the filter bags is to pre-wet the feedstock in a separate pre-wetting subsystem prior to introducing the pre-wet powder into the fluidization chamber. This approach is shown in FIG. 1C, where in a separate loss-in-weight feeder, the feedstock is pre-wet prior to being introduced into fluidization chamber. Water was added via tubing from a syringe pump at a rate of 32 mL/min with the mixer running at 120 rpm (a Froude number of ~1.2). Mixing continued for five minutes after the water addition was completed. The blend was then pneumatically transferred from the mixer to the FBG inlet. By pre-wetting the feedstock, it has been surprisingly shown that the material adhering to the filter bags are substantially reduced. As seen in FIG. 9B, discussed below, $m_{total}$ and $m_{bed}$ are much closer to each other, a sign of optimized granule sizing. The pre-wetting of the dry feedstock span a range from 0% to about 5% to about 10%. Referring to FIGS. 10A-10D, discussed further below, results are shown from various runs with different levels of pre-wetting. Additionally, blowback pressure was also varied. As seen in FIGS. 10A-10D, by far, the largest effect in how close $m_{total}$ and $m_{bed}$ are to each other is by pre-wetting. For example the bottom plot shows a 5% pre-wet feedstock and the separation of the $m_{total}$ and $m_{bed}$ is more pronounced. Adjusting the blowback pressure for the 10% pre-wet feedstock produces little change in separation of $m_{total}$ and $m_{bed}$.

Figure 1D:
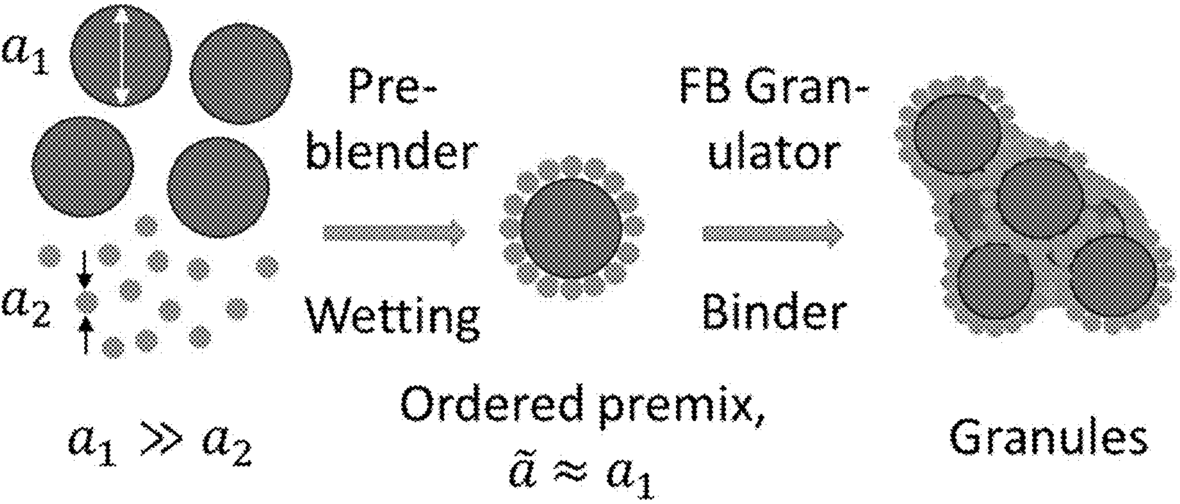
FIG. 1D is a schematic showing the concept of granulation with pre-wet feedstock.

Pre-wetting the feedstock powder provides the opportunity to create an ordered premix, reducing the amount of fine powder that is susceptible to elutriation, and providing for more robust process control, especially during the early stages of fluidization and spray-granulation, as shown in FIG. 1D which is a schematic showing the concept of granulation with pre-wet feedstock. The Stokes model, known to a person having ordinary skill in the art, was applied which describes the balance of viscous dissipation and inertial forces in a fluidized granulation system, where $\rho_g$ is the granule density, u is the fluidization collision velocity, μ is the liquid viscosity, and $\tilde{a}$ is the harmonic mean radius of a colliding pair (1, 2), see FIG. 1D. Particle attachment occurs when the Stokes number of a collision is less than a critical value, thus favoring layering of fine particles around coarse cores. In this case, the cores were microcrystalline cellulose (MCC), the fines were micronized acetaminophen (APAP), and the viscous dissipation was adhesion between APAP and the surface-wet MCC. In addition to providing compositional ordering, the prewetting layering model provides growth from about 100 μm to about 130 μm, shifting the system above the elutriation threshold of about 120 μm. In general, the feedstock may include micronized active pharmaceutical ingredient (API) formulation comprising one or more of about 20-80% by weight of micronized API, 30-70% by weight of micronized API, or 40-60% by weight of micronized API, and may further include an excipient core. The excipient core may be adapted to absorb water. The excipient core may constitute a mean size between about 80 to about 150 μm. The excipient core may include MCC. The MCC may include one or more of MCC PH102 or MCC PH302, as known to a person having ordinary skill in the art.

As discussed above, three different aspects are balanced (mass, energy, and fluidization), according to the present disclosure. Above provides a detailed discussion of mass balance. Energy balance is predominantly based on enthalpy balance. Enthalpy, as known to a person having ordinary skill in the art, is generally a thermodynamic concept and is expressed as the sum of a system's internal energy and a product of its pressure and volume (i.e., H=E+PV). The enthalpy balance is established based on evaporation of the binder liquid and heat provided by the fluidization process. Energy balance can be expressed as:

$$\dot{H}_{p,i} + \dot{H}_b + \dot{H}_{a,i} = \dot{H}_{p,x} + \dot{H}_{a,x} + \dot{H}_{loss} + \dot{H}_{evap},$$

where $\dot{H}_{p,i}$ is feedstock enthalpy,
$\dot{H}_b$ is binder enthalpy,
$\dot{H}_{a,i}$ is inlet air enthalpy,
$\dot{H}_{p,x}$ is granulated product enthalpy,
$\dot{H}_{a,x}$ is outlet air enthalpy,
$\dot{H}_{loss}$ represents loss due to conductive and convective heat loss, and
$\dot{H}_{evap}$ is evaporative enthalpy. The heat loss is further defined $$\dot{H}_{loss} = U \cdot A \cdot \Delta T,$$

where U is the heat transfer coefficient in the fluidization chamber (expressed in $kJ \cdot s^{-1} \cdot m^{-2} \cdot ° K^{-1}$). Binder or product enthalpy is further defined as:

$$\dot{H}_b \text{ or } \dot{H}_{p,x} = \dot{M} \cdot [(1 - W) \cdot C_{p,solid} + W \cdot C_{p,water}] \cdot T,$$

where $C_{p,solid}$ or $C_{p,water}$ is the specific heat capacity of granulated product or water, respective, defined as energy required to increase one unit of mass by one unit of temperature and is (expressed in $kJ \cdot kg^{-1} ° K^{-1}$, e.g., $C_{p,water}$ is 4184 $kJ \cdot kg^{-1} \cdot ° K^{-1}$). Enthalpy of vaporization ($\dot{H}_{evap}$) is expressed by:

$$\frac{\dot{H}_{evap}}{\dot{M}_{evap}} = (3155 - 2.39T) \text{ where } T \text{ is temperature in } °K.$$

In an actual reduction to practice, APAP—active drug, was used with MCC as excipient powder, and with Hydroxypropyl cellulose (HPC) as the liquid binder. HPC (HPC, Klucel EF Pharm, Ashland, Wilmington, DE, USA) powder was dissolved in distilled water at a concentration of 8% w/w, which creates a binder solution with a viscosity of 0.180 Pa, a density of 1.01 g/cm$^3$, and a surface tension of 40.941 mN/m at room temperature. The feedstock powder formulation included a blend comprised of equal parts by mass of MCC Avicel PH102 and micronized APAP. MCC Avicel PH 102 had a mean size of about 90 μm to about 120 μm and a true density of about 1.56 g/cm$^3$; the micronized APAP had a mean size of about 10 μm to about 20 μm and a true density of about 1.29 g/cm$^3$. The material density of both MCC and APAP was about 1.4 g/ml. The HPC binder solution was introduced into the formulation at a dry basis concentration between 3 and 4% wt/wt. The net formulation included about 47% wt/wt micronized APAP. Residual moisture after granulation was about 3% wt/wt. During granulation with moisture content averaging about 10%, the effective particle density was estimated to be about 1.2 g/ml for the shape factors described.

Figure 2A:
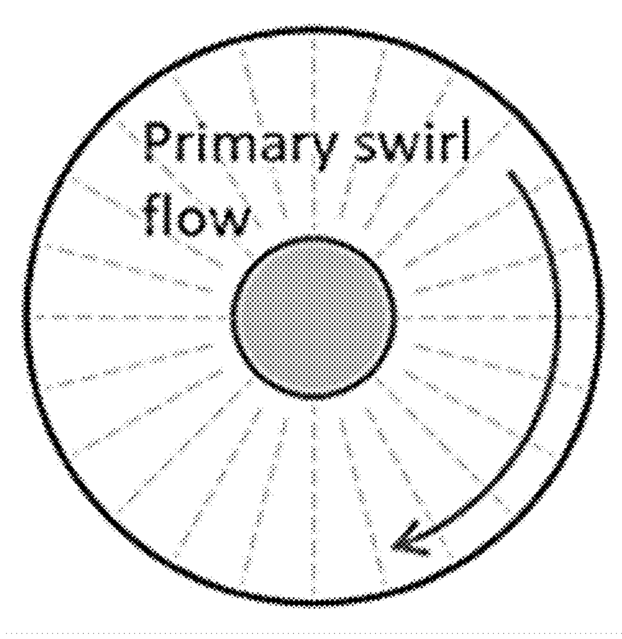
FIG. 2A depicts a plan view of the lower half of the fluidized bed granulation and coating system of FIG. 1A, showing the primary swirl flow path.
Figure 2B:
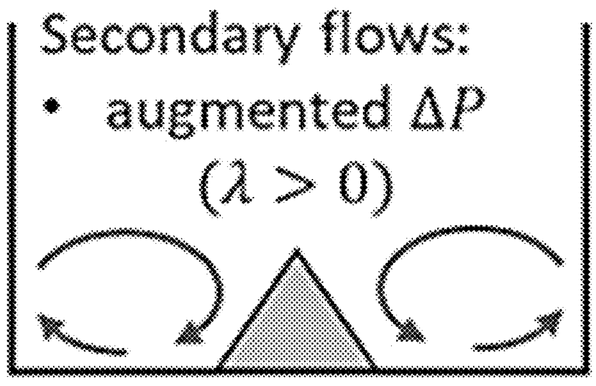
FIG. 2B depicts a cross-sectional view of the lower half of the fluidized bed granulation and coating system of FIG. 1A, showing the secondary swirl flow path with $\lambda>0$.
Figure 2C:
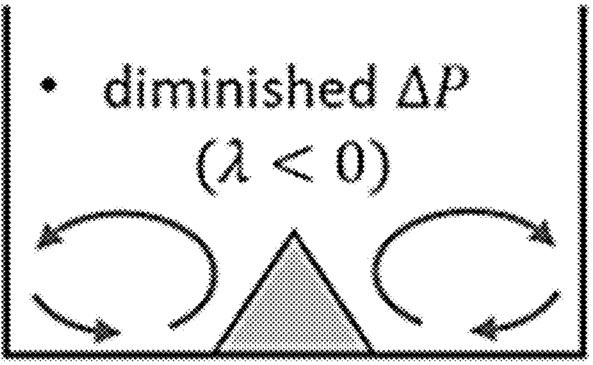
FIG. 2C depicts a cross-sectional view of the lower half of the fluidized bed granulation and coating system of FIG. 1A, showing the secondary swirl flow path with $\lambda<0$.

The effects of how the flow field affects the fluidization bed pressure drop through wall friction was also investigated. Wall friction effects can augment or diminish the bed pressure drop depending on whether secondary vortices in the toroidal flow are climbing or sliding down the wall of the product container, as shown in FIGS. 2A, 2B, and 2C (positive or negative λ, respectively). In the case of granulation, the prevailing direction of secondary vortices may change with growth, i.e., λ evolving from negative to positive during the growth process. In coating, core granules are typically large enough to maintain a stable climbing flow (i.e., λ→1) throughout. The flow field model was deduced empirically based on pressure drop measurements, with primary swirl flow validation via dense-flow video tracking. The distributor plate pressure drop, ΔPplate, was derived using data collected with an empty bed. The product bed pressure drop is obtained using ΔPbed=P1−P2−ΔPplate (see, FIG. 1A).

Figures 3A, 3B, 3C, 3D:
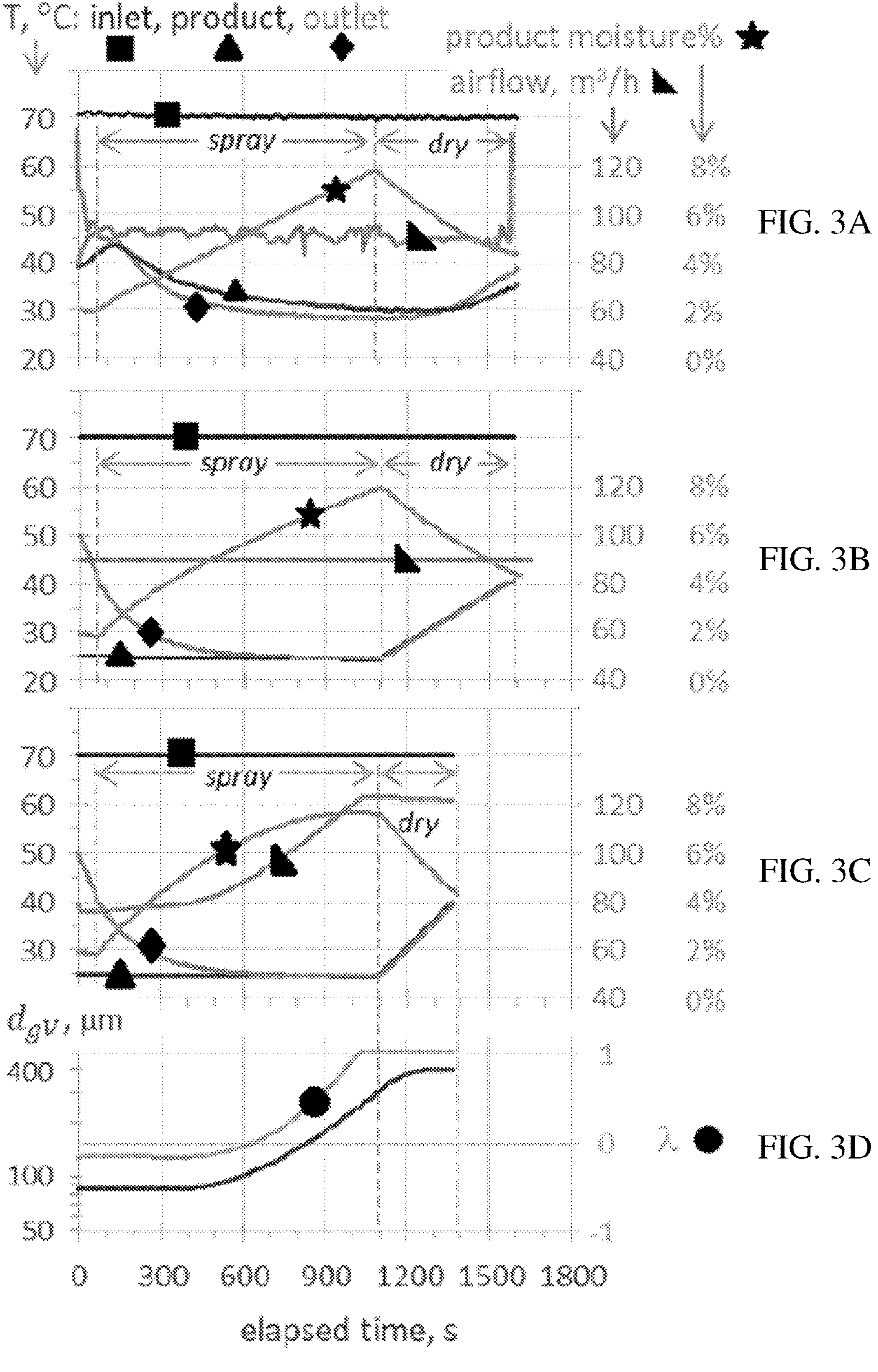
FIG. 3A depicts a graphical representation showing process data and the derived moisture balance in fluidized bed granulation for an experimental mass balance.
FIG. 3B depicts a graphical representation showing process data and the derived moisture balance in fluidized bed granulation for a prediction model using mass and energy balance.
FIG. 3C depicts a graphical representation showing process data and the derived moisture balance in fluidized bed granulation empirical growth model affecting secondary flows (k).
FIG. 3D depicts a graphical representation of graphs of granule growth vs. elapsed time.

Results are presented herein based on experimental data, as shown in FIGS. 3A, 3B, 3C and 3D which are complex graphs of Temperature in ° C., airflow in m$^3$/h, and product moisture % vs. elapsed time in seconds. FIG. 3A is data obtained from fluidized bed granulation of a 3 kg of dry-basis proxy pharmaceutical formulation comprising lactose monohydrate (e.g., as can be obtained from Foremost Farms of Baraboo, WI), microcrystalline cellulose (e.g., Avicel PH101 from FMC Corp. of Philadelphia, PA), and a 35% polyvinylpyrrolidone binder solution (e.g., Plasdone K-30 from Ashland Chemical of Wilmington, DE). FIG. 3B shows a predictive model of the same run using a mass and energy balance. The energy balance requires a heat loss model (derived empirically) and two adjustable parameters: 1) heat transfer from the inlet air to the product; and 2) falling rate drying curve decay parameter. For perspective, the range of volumetric airflow from 80 to 120 m$^3$/h corresponds to superficial air velocity in the range of about 0.3 to 0.5 m/s.

Using the same product inventory, inlet temperature and spray rate, an optimization is disclosed as shown in FIG. 3C, whereby the airflow is constrained by a fluidization balance, ΔPplate/ΔPbed=1.2. The airflow constraint includes the predicted wall friction in context of an empirical growth model, as shown in FIG. 3D, which depends on in-process product moisture (see, FIG. 3C). The result of the optimization with the same product inventory is a cycle time reduction of about 3 minutes, with marginally increased growth, dgV increasing from 360 to about 400 μm; however, the forecast size growth may be compromised by attrition with higher airflow in the drying segment. Using the same fluidization ratio to constrain airflow, the integrated model predicts higher capacity with increased product inventory (e.g., 20% increase to 3.6 kg dry basis), commensurate spray rate (48→65 g/min), and higher inlet air temperature (70→75° C.).

Figures 4A, 4B:
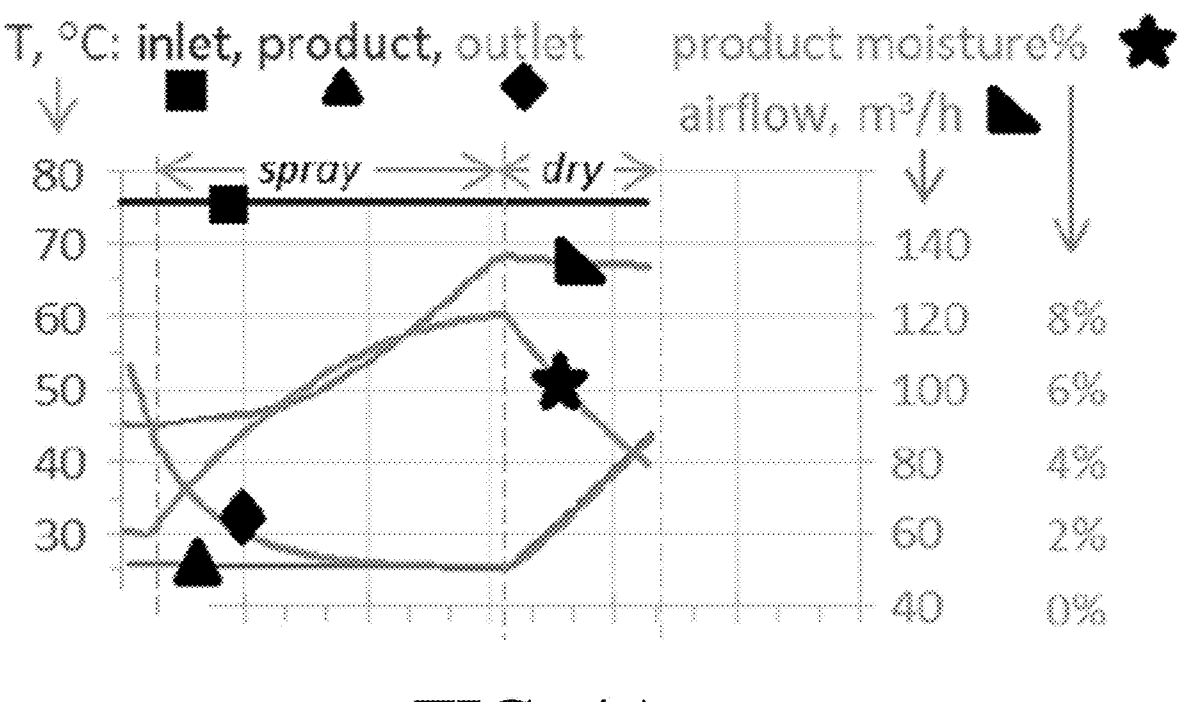
FIG. 4A depicts a graphical representation of a hypothetical capacity increase (greater than 120% of baseline) using the integrated model, showing the process parameters (such as airflow, temperature) and the calculated moisture balance.
FIG. 4B depicts a graphical representation of a hypothetical capacity increase (greater than 120% of baseline) using the integrated model, showing the process empirical growth model affecting secondary flows (k).

FIGS. 4A and 4B, which are again complex graphs of Temperature in ° C., airflow in m$^3$/h, and product moisture % vs. elapsed time in seconds illustrate this hypothetical optimization. Note that higher airflow increases ΔPplate, needed to maintain the pressure drop ratio with the heavier bed. Higher airflow increases drying enthalpy; together with the marginal increase in temperature setpoint, the model predicts a marginal reduction in cycle time from the previous optimization (FIG. 3C). Hence, a capacity increase is reasonable, with a caveat regarding the effect of increased airflow on the growth model and/or attrition in the drying segment.

Fluidized bed coating processes typically start with an inventory of granular seed or pellet particles, with the secondary flow pattern in the toroidal bed consistently climbing the wall, i.e., λ→1. As such, airflow adjustment is anticipated only in response to accumulated coating mass, which is applied slowly to achieve uniformity without twinning or agglomeration.

Accordingly, monitoring and control of flow fields is important to particulate processes. In fluidized beds, the integration of fluidization, mass, and energy balance models offers a way forward toward predictive control and optimization of granulation and coating. In the case of granulation, airflow may be controlled to maintain a consistent pressure drop ratio (e.g., ΔPplate/$\Delta P_{bed}$ ranging from 1 to 1.5, or in certain applications, 1.2) as the bed mass grows with binder addition and prevailing flow fields change with granule growth. While flow fields are more consistent throughout most coating applications, airflow adjustment may be needed depending on the dry-basis mass of coating material applied.

The pre-wetting techniques described above provide one or more of improved capacity, yield, and product quality (e.g., narrower size distributions, better flowability, and improved manipulations of granule shape and porosity) for formulations having high levels of micronized activities. Tables 1A, 1B, and 1C combine to show a sample selection of various formulations (e.g., powders, binders) and process parameters (e.g., mass, airflow, temperature, spray-rate) for example applications described herein.

TABLE 1A

Provides a first portion of a data showing a selection of various formulations and process parameters for example granulation applications

| Example # | DoE Comments | Run | Powder formulation APAP/MCC | APAP type | MCC type | feed, kg |
|---|---|---|---|---|---|---|
| 1 | Comparing | 3 | 50/50 | micronized | PH102 | 2.8 |
| 2 | different levels of | 15 | 50/50 | micronized | PH102 | 2.8 |
| 3 | pre-wetting | 6 | 50/50 | micronized | PH102 | 2.8 |
| 4 | Adding binder as | 4 | 50/50 | micronized | PH102 | 2.8 |
| 5 | dry powder with pre-wetting to decrease cycle time | 5 | 50/50 | micronized | PH102 | 2.8 |
| 6 | Pre-wetting at | 16 | 50/50 | micronized | PH102 | 2.8 |
| 7 | different | 17 | 50/50 | micronized | PH102 | 2.8 |
| 8 | enthalpies and | 18 | 50/50 | micronized | PH102 | 2.8 |
| 9 | binder rates | 19 | 50/50 | micronized | PH102 | 2.8 |
| 10 | Pre-wetting MCC alone | PW-4 | 0/50 | N/A | PH102 | 3 |

TABLE 1B

Provides a continuation of the data shown in Table 1A

| Example # | Binder type | conc % | % dry | Dry, Kg | Total dry kg | Prewet wt/wt | Inlet airflow m^3/h | T, C |
|---|---|---|---|---|---|---|---|---|
| 1 | HPC | 8% | 0% | 0 | 2.8 | 0.00% | 110 | 80 |
| 2 | HPC | 8% | 0% | 0 | 2.8 | 5.00% | 110 | 80 |
| 3 | HPC | 8% | 0% | 0 | 2.8 | 10.00% | 110 | 80 |
| 4 | HPC | 8% | 25% | 0 | 2.8 | 10.00% | 110 | 80 |
| 5 | HPC | 8% | 50% | 0 | 2.8 | 10.00% | 110 | 80 |
| 6 | HPC | 8% | 0% | 0 | 2.8 | 5.00% | 100 | 70 |
| 7 | HPC | 8% | 0% | 0 | 2.8 | 5.00% | 120 | 85 |
| 8 | HPC | 8% | 0% | 0 | 2.8 | 10.00% | 100 | 70 |
| 9 | HPC | 8% | 0% | 0 | 2.8 | 10.00% | 120 | 85 |
| 10 | HPC | 8% | 0% | 0 | 3 | 10.00% | 110 | 80 |

TABLE 1C

Provide another continuation of the data of Table 1A.

| Example # | Spray amt, kg | Spray rate, g/min | Spray pressure, bar | Spray air cap | Liquid-powder ratio | Binder content in end product Dry basis | Size & Shape Analysis dg | sg | FF* |
|---|---|---|---|---|---|---|---|---|---|
| 1 | 1.05 | 70 | 0.8 | 3.3 | 0.35 | 3.00% | Failed; Unstable Granulation | | |
| 2 | 1.05 | 70 | 0.8 | 3.3 | 0.40 | 3.00% | 224.2 | 1.54 | 0.795 |
| 3 | 1.05 | 70 | 0.8 | 3.3 | 0.45 | 3.00% | 217.6 | 1.548 | 0.821 |
| 4 | 0.7875 | 70 | 0.8 | 3.3 | 0.36 | 3.00% | 167.8 | 1.561 | 0.721 |
| 5 | 0.525 | 70 | 0.8 | 3.3 | 0.27 | 3.00% | Failed; Unstable Granulation | | |
| 6 | 1.05 | 55 | 0.8 | 3.3 | 0.40 | 3.00% | 224.6 | 1.5 | 0.777 |
| 7 | 1.05 | 85 | 0.8 | 3.3 | 0.40 | 3.00% | Failed; Unstable Granulation | | |
| 8 | 1.05 | 55 | 0.8 | 3.3 | 0.45 | 3.00% | 226.5 | 1.559 | 0.764 |
| 9 | 1.05 | 85 | 0.8 | 3.3 | 0.45 | 3.00% | 176 | 1.595 | 0.8 |
| 10 | 0.85 | 70 | 0.8 | 2.3 | 0.38 | 2.28% | 198.7 | 1.354 | 0.855 |

Figure 5:
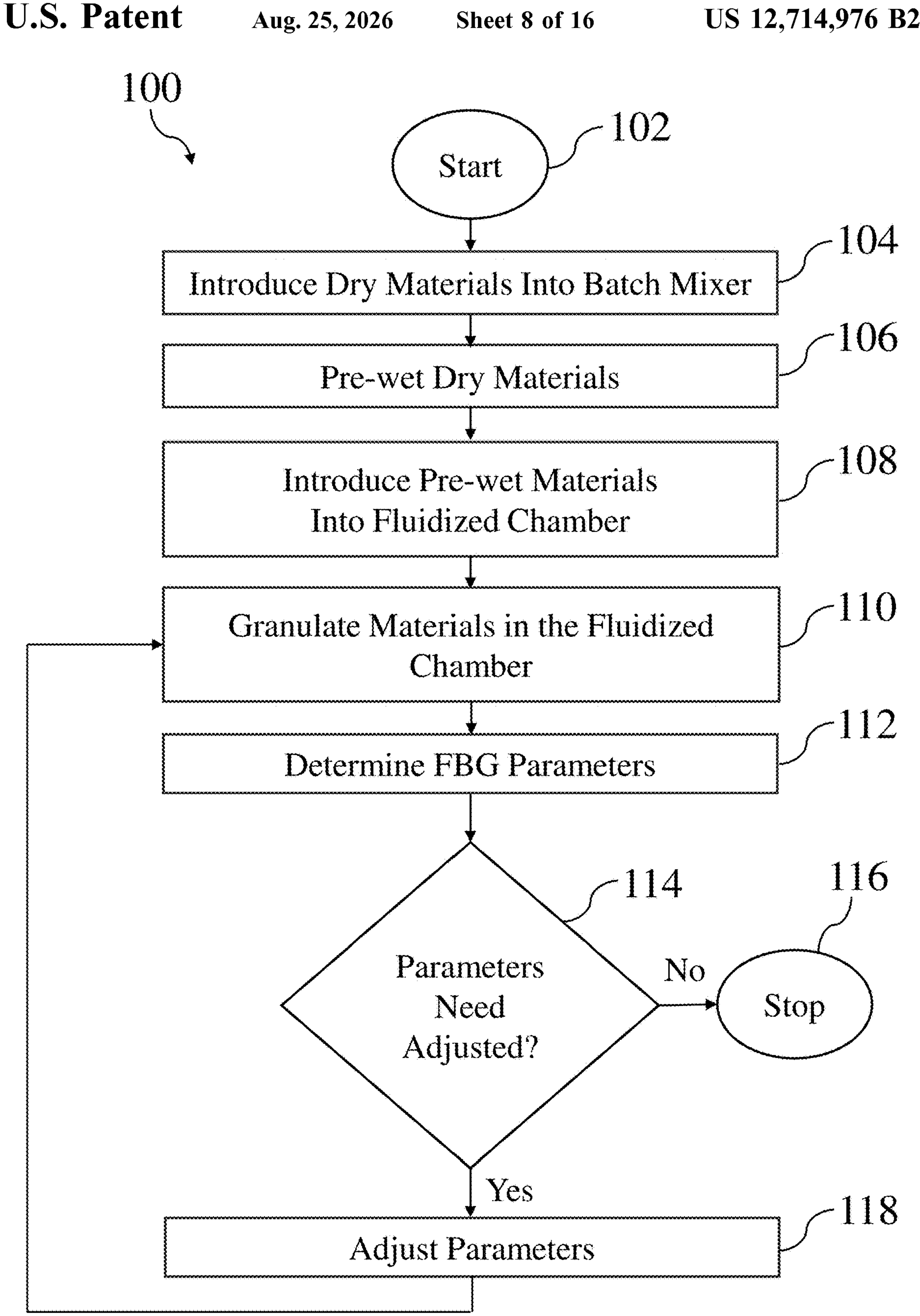
FIG. 5 depicts a flowchart showing one example method of granulating materials using FBG.

FIG. 5 shows a flowchart representation of one example method 100 of granulating materials using the alternative FBG system (pre-wet FBG System) shown in FIG. 1C. The method 100 starts, at step 102, with an introduction of one or more dry materials into a batch mixer at step 104 to prepare the dry formulation prior to granulation. Next, at step 106, the dry formulation may be pre-wet using a liquid, e.g., distilled water, before the pre-wet material is transferred into the fluidization chamber, at step 108. Once the pre-wet material is introduced into the fluidization chamber and the fluidization chamber is activated and operational, step 110, one or more parameters of the pre-wet FBG System may be determined, step 112. For example, parameters such as mass, airflow, internal temperature, or spray rate may be monitored during granulation. A processor (see, FIG. 6) coupled with the pre-wet FBG System may be configured, at step 114, to compare one or more of the measured parameters with a pre-configured baseline established, e.g., by comparing $m_{total}$ and $m_{bed}$ values, to determine whether the one or more measured parameters needs adjusted to bring the parameter within the pre-configured baseline range. Consequently, the processor may generate and transmit instructions to affect the change within the pre-wet FBG System at step 118. During the granulation operation, the pre-wet FBG System may continuously or near-continuously monitor and adjust parameters. Once the granulation process is completed, the pre-wet FBG System can deactivate, and the method can end 116.

Figure 6:
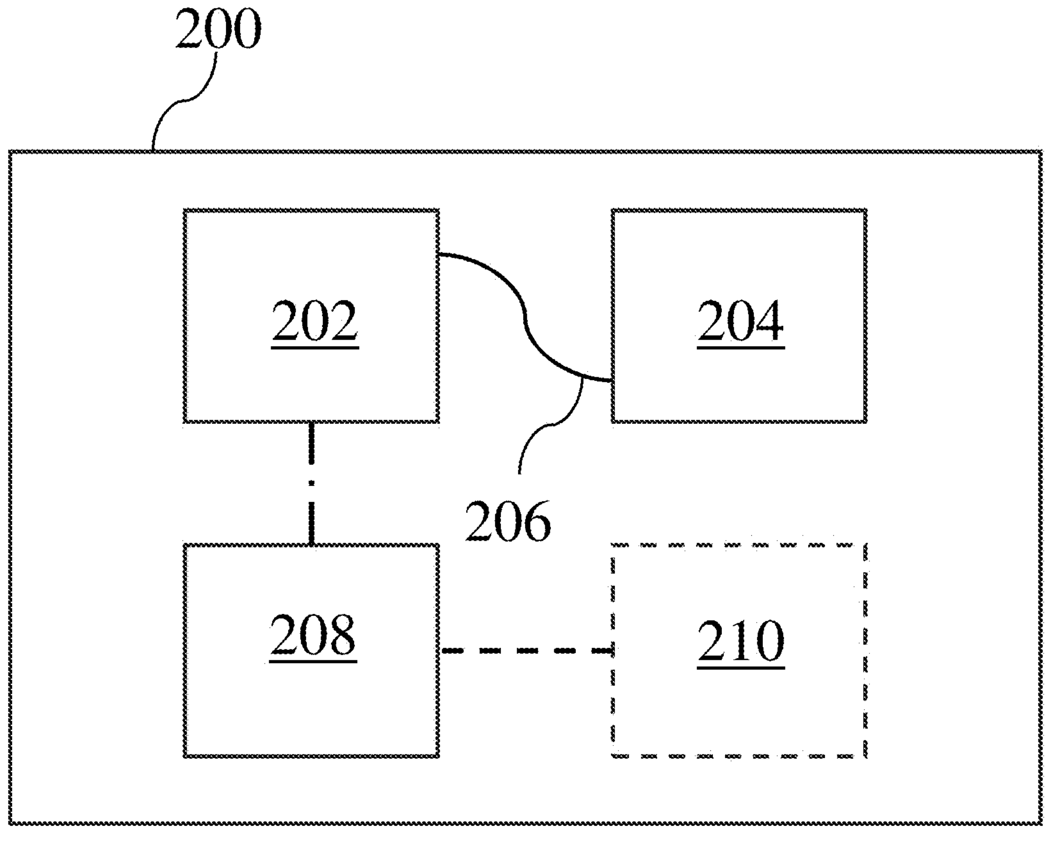
FIG. 6 depicts a block diagram showing one example of the FBG system configured to perform the method of FIG. 5.

FIG. 6 shows one example pre-wet FBG System 200 configured to perform the method 100 described herein. Particularly, the pre-wet FBG System 200 includes an FBG processor 202, a batch mixer 204, a transfer conduit 206, and a processor system 208. The processor system 208 can implement processes of various aspects described herein.

The processor system 208 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, storing data, managing data, or handling data, whether implemented with electrical, magnetic, optical, biological components, or otherwise. The processor system 208 can include Harvard-architecture components, modified-Harvard-architecture components, or Von-Neumann-architecture components.

The pre-wet FBG System 200 can further include a user interface 210 to allow user input as needed. The user interface system 210 can include a mouse, a keyboard, another computer (connected, e.g., via a network or a null-modem cable), or any device or combination of devices from which data is input to the processor system 208. The user interface 210 also can include a display device, a processor-accessible memory, or any device or combination of devices to which data is output by the processor system 208) The user interface 210 and data storage system of the processor system 208 can share a processor-accessible memory. The pre-wetting components are not shown in FIG. 6, but may be included according to the description above.

Figures 7A, 7B:
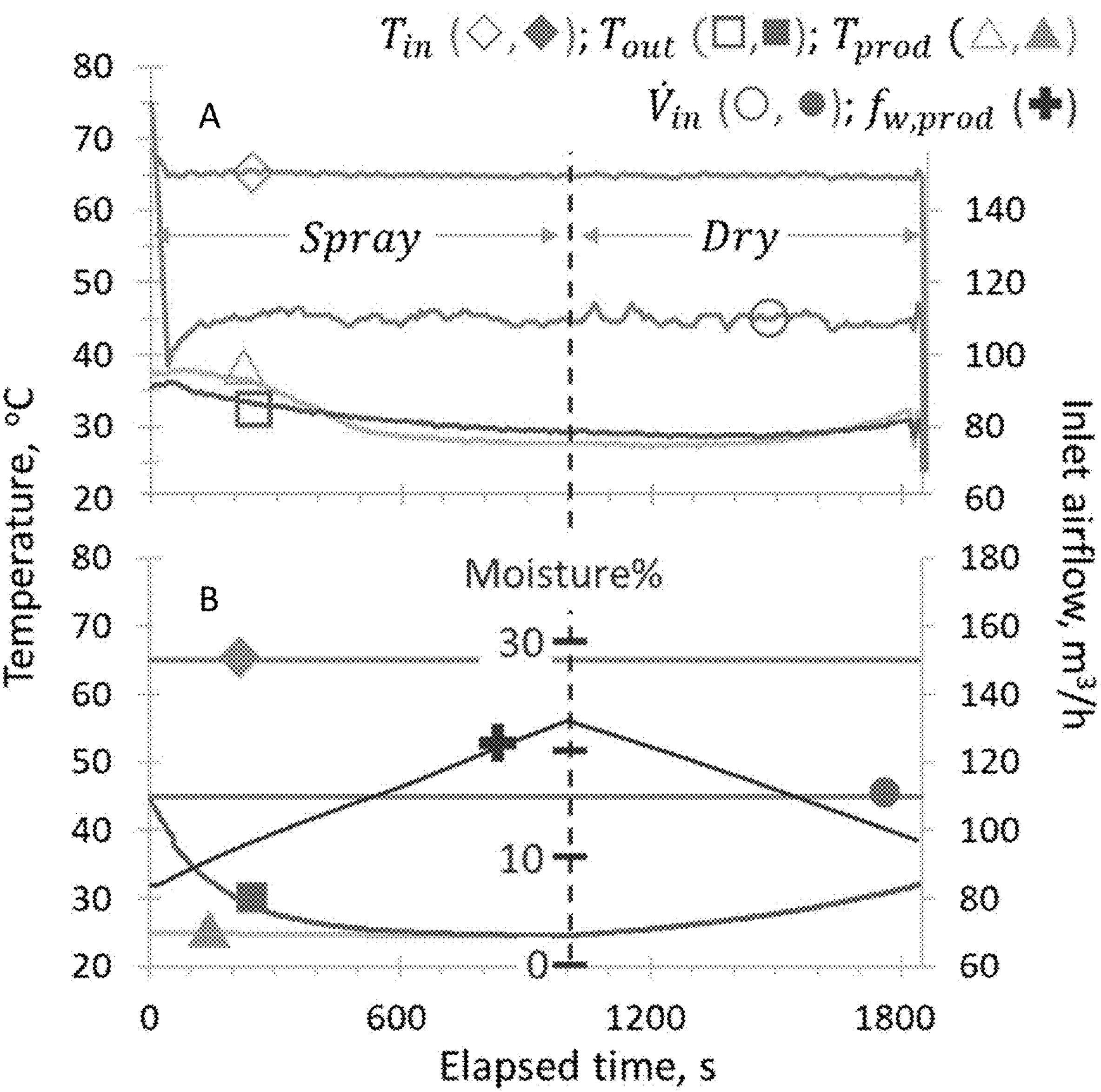
FIG. 7A and FIG. 7B are graphs of temperature in ° C. vs. elapsed time in seconds vs. inlet airflow in $m^3/h$, where FIG. 7A provides sensor data in the Xelum R&D Fluidized Bed Granulation System and FIG. 7B provides the corresponding predictive mass and energy balance.

The 8% wt/wt liquid binder hydroxypropyl cellulose (HPC) solution was atomized using a 3.3 mm cap air-atomized nozzle at a spray air gauge pressure of 0.8 bar, a microclimate gauge pressure of 0.1 bar and sprayed at a rate of 70 g/min. Table 2 summarizes the pre-wetting levels, blowback pressures, and resultant process times in the experimentation process. The maximum and end moisture contents are calculated based on the mass and energy balance, where $f_{w,prod}$ is the fractional moisture content of the product in the bed, shown in FIGS. 7A and 7B which are graphs of temperature in ° C. vs. elapsed time in seconds vs. inlet airflow in $m^3$/h, where FIG. 7A provides sensor data in the Xelum R&D Fluidized Bed Granulation System and FIG. 7B provides the corresponding predictive mass and energy balance, and where the LOD moisture content is the Loss on Drying results measured using a moisture analyzer (Mettler Toledo HG63 moisture analyzer, Mettler-Toledo, LLC1900 Polaris Parkway Columbus, OH 43240).

TABLE 2

Summarizing the pre-wetting (PW) levels and blowback (BB) pressures used in each run; % values are wt/wt; binder is dried basis

| | | | | | | | Moisture % | | |
|---|---|---|---|---|---|---|---|---|---|
| | PW, | Binder, | BB, | Time, s | | | | | LOD (loss on |
| Run | % | % | bar | Spray | Dry | Total | Max | End | drying) |
| 1 | 0 | 3 | 3.8 | 965 | 600 | 1565 | 16.2 | 9.9 | 2.8 |
| 2 | 5 | 3 | 2.8 | 970 | 420 | 1390 | 16.7 | 12.6 | 4.0 |
| 3 | 5 | 3 | 3.8 | 970 | 643 | 1613 | 16.8 | 10.4 | 3.8 |
| 4 | 5 | 3 | 4.8 | 960 | 695 | 1655 | 16.6 | 9.6 | 3.1 |
| 5 | 10 | 3 | 2.8 | 970 | 846 | 1816 | 20.2 | 11.8 | 2.8 |
| 6 | 10 | 3 | 3.8 | 1010 | 829 | 1839 | 20.0 | 11.6 | 2.7 |
| 7 | 10 | 3 | 4.8 | 1060 | 700 | 1760 | 17.2 | 10.3 | 4.1 |
| 8 | 10 | 4 | 3.8 | 1304 | 1112 | 2416 | 22.1 | 11.1 | 2.9 |

The mass and energy balances can serve as a reliable predictive control model for the process. They equilibrate the mass and energy transfers within the system by balancing the enthalpies of the fluidization gas, drying of the product in conjunction with the latent heat of vaporization, and specific heating of the product in the falling-rate stage of drying (FIG. 7B). The fluidization gas typically consists of air, which can be modified to regulate inlet humidity, or an inert gas can be employed, depending on the product and process safety prerequisites.

The size and shape distribution of granules produced by the Fluid Bed system were characterized using dynamic image analysis (DIA). Size and shape results for each run were compared using a statistical analysis package, JMP® (Version 16.0.0. SAS Institute Inc., Cary, NC, 1989-2021).

During the spraying step, binder solution is introduced into the powder bed through the two bottom-spray nozzles via a binder feed pump with a controlled spray mass flow rate, $\dot{m}_s$, over an elapsed spray time, t (s). At the same time, binder moisture is evaporated according to the evaporation rate, $\dot{m}_{evap}$. The amount of water evaporated during a time-step can be calculated using the humidity sensors or the enthalpy of vaporization $\Delta H_{evap}$ of water at a constant pressure and temperature. The enthalpy of vaporization is the input of energy required to transform one gram of liquid water into water vapor; it was modelled with a linear temperature dependence, as provided below:

$$\Delta H_{evap}(J/g) = -2.3945 \cdot T + 2501.6.$$

With the 8% wt/wt HPC binder solution used in this study, the masses of binder solids, $m_b$, and moisture, $m_w$, introduced to the system were calculated by summing over time-steps, Δt=10 s, as provided below:

$$m_b = \sum(\dot{m}_s \cdot 0.08)\Delta t$$

$$m_b = \sum(\dot{m}_s \cdot 0.08)\Delta t$$

Figure 8:
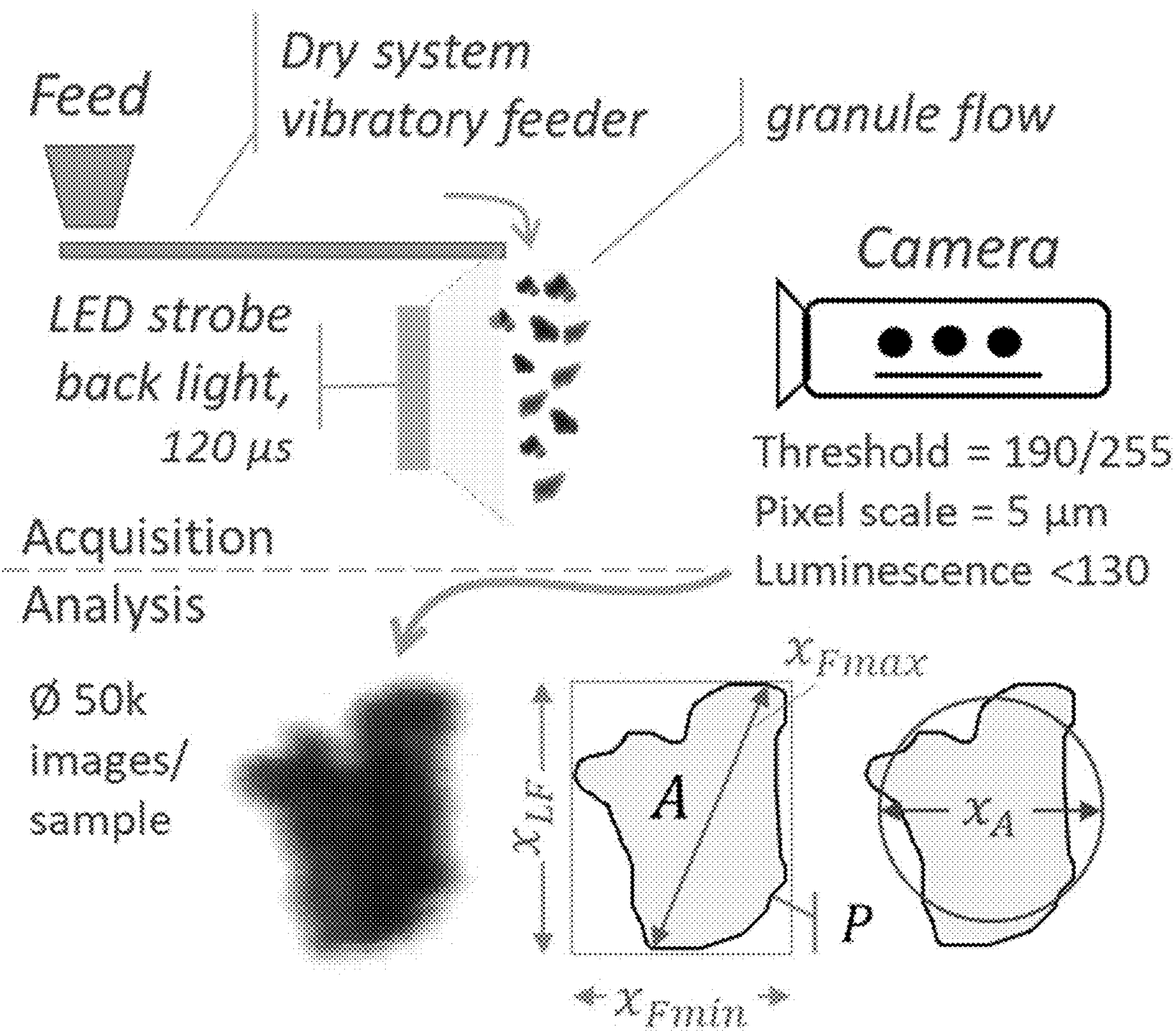
FIG. 8 is a general schematic of an image analysis approach for imaging granules.

The size and shape data were collected using a Dynamic Image Analysis (DIA) system (SolidSizer, J M Canty, Lockport, NY, USA). The DIA instrument is shown in FIG. 8 which is a general schematic of the image analysis and which uses a PID-controlled vibratory feeder to maintain a steady feed of granules with a target fraction (0.2%) of the image area occupied. A high-speed camera captured 2D projections of randomly oriented particles. After sampling and riffling, about 1 g of granules (≈50,000 particles) images were detected and analyzed for various features, including minimum and maximum Feret lengths $x_{Fmin}$ and $x_{Fmax}$, the orthogonal to the minimum Feret, $x_{LF}$, the particle projected area (A), and perimeter (P). The size and shape distributions were analyzed programmatically. Additional calculated features included the area-equivalent size, $x_A$, the box Aspect Ratio, $AR_{box}$, Form Factor, FF, and Elliptical Form Factor, EFF. The data were analyzed at a threshold of 190 out of a grayscale of 0-255 and a pixel scale of 5 microns/pixel and the particles with a luminescence of over 130 are considered out of focus and were filtered out. The above parameters are further described below:

$$x_A = \sqrt{4A/\pi}$$

$$FF = 4\pi A/P^2$$

-continued $$AR_{box}=x_{Fmin}/x_{LF}$$

$$EFF=\beta\pi A/P^2$$

$$\text{where } \beta=\left(1.5\cdot(AR+1)/\sqrt{AR}-1\right)^2.$$

The granulation process relied on the product temperature as an endpoint indicator, with the process being stopped when the product temperature sensor reached 32° C., see FIGS. 7A and 7B, which also illustrates the percentage of product moisture, showing an increase to maximum moisture during spraying, followed by drying to reach the final moisture level.

In a conventional mass and energy balance, the amount of binder is assumed to be well mixed with the powder, providing an average moisture content of L/S (or liquid mass to solid mass) in the fluidized chamber. Accordingly, the mass and energy balances are coupled with analysis of the pressure drop across the bed. This analysis allowed the quantification of the powder mass residing within the bed during the spraying segment. In fluid bed granulation, a uniform product is preferably achieved by having a spray flux applied uniformly to the fluidized powder.

Previous work has used a dimensionless spray flux to describe the flux of binder droplets relative to a contact surface area of powder, i.e., the powder flux. According to the present disclosure, we consider the spray relative to the contact area of the fluidized powder in the spray zone. The powder flux is described by a simplified compartment model having two zones: 1) fluidization associated with binder spray, granulation, and drying; and 2) elutriation-blowback associated with the operation of the filter-bags, see 30 in FIG. 1A. Material can transition from one zone to the other; for example, branch (a) of the figure shows elutriation of fine particles experiencing air drag in excess of gravitational body forces, and branch (b) shows re-engagement of elutriated particles, which may be primary particles or weak agglomerates, which are released by filter blowback.

Ideally, the process can be controlled to have all the powder in the fluidized zone, minimizing the amount in the elutriation-blowback cycle. With micronized powder that is subject to elutriation, the product uniformity depends on the re-entrant branch (b) from the elutriation-blowback cycle to reincorporate fines into the granulation process. According to the present disclosure, different methodologies to optimize and maximize the presence of powder within the spray zone during granulation were examined. Pressure-drop measurements combined with the enthalpy balance were used to track the amount of powder in the spray zone during the spraying segment.

In the best-case scenario, there is a full re-engagement of blow-back fines into the spray/growth cycle, and the binder spray is uniformly distributed over the full product mass. In the worst-case, fines are immediately elutriated after blowback, and the binder is distributed only with the bed mass in the stable fluidization zone, resulting in an excess of binder in the bed product and a deficit in the baghouse fines.

The moisture balance model assumes that moisture accumulation is specific to the fluidized bed mass, i.e., in the path of the binder spray flux. The moisture mass of the fluidized bed, $m_{w\_bed}$, is found via a mass-balance where $m_{w\_in}$ is the sum of the inlet product moisture including pre-wetting, the moisture content of the inlet airflow, and binder-spray moisture; and $m_{w\_out}$ is the moisture content of the exhaust airflow, i.e., $$m_{w\_bed}=m_{w\_in}-m_{w\_out}.$$

It should be noted that if the charging air is at ambient temperature, using the humidity sensors, the loss in moisture during the charge transfer step can be accounted for using the mass and energy balance.

Knowing the total mass of dry powder, $m_p$, and binder solids, $m_{bs}$, added into the system, and tracking the mass and energy balances, the instantaneous total mass, $m_{total}$, is determined as provided above (i.e., $m_{total}=m_p+m_{w\_bed}+m_{bs}$).

It should be further noted that the total mass includes the mass of the powder in the bed, on the filter bags and product container walls. The fractional moisture can then be compared relative to total mass versus the measured bed mass based on the pressure-drop analysis, as provided below:

$$f_{w\_total}=m_{w\_bed}/m_{total}$$

$$f_{w\_bed}=m_{w\_bed}/m_{bed}$$

Figure 9A:
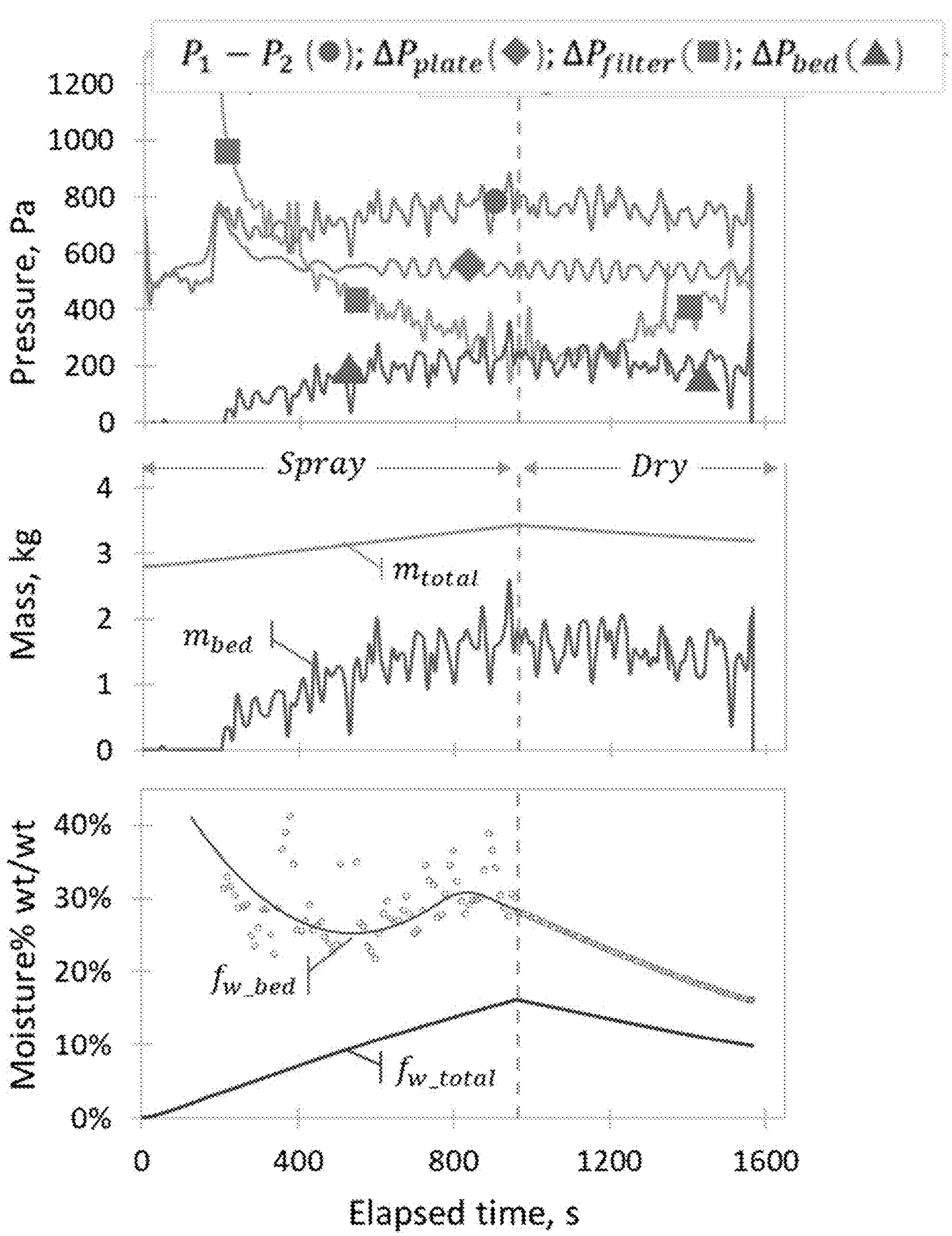
FIG. 9A and FIG. 9B are graphs of pressure in Pa, mass in kg, and moisture in & wt/wt each vs. elapsed time showing mass and energy balance for FIG. 9A representing one run and FIG. 9B representing another run.
Figure 9B:
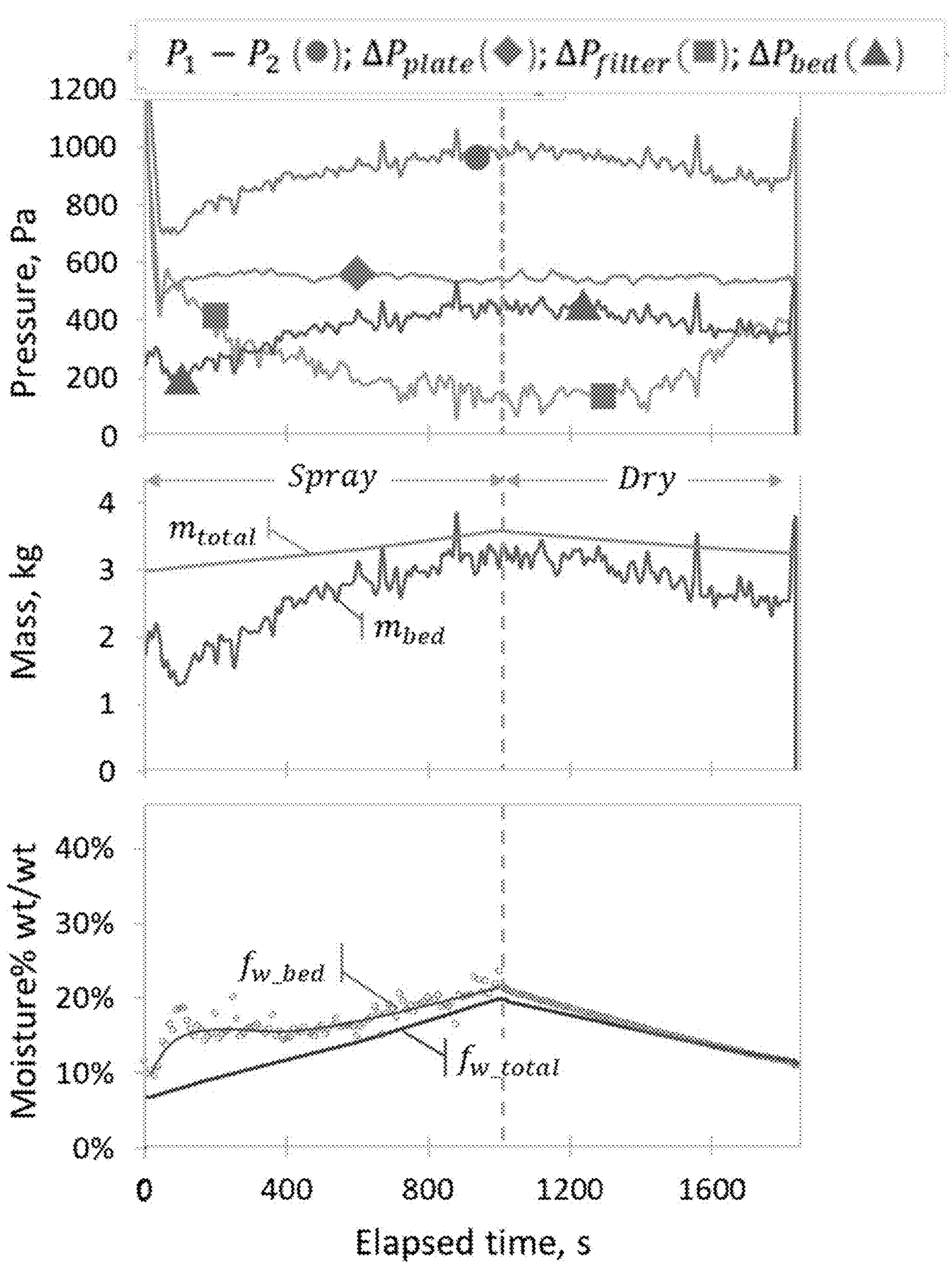

FIG. 9A and FIG. 9B which are graphs of pressure in Pa, mass in kg, and moisture in & wt/wt each vs. elapsed time showing mass and energy balance for FIG. 9A representing one run and FIG. 9B representing another run. These figures show that at the end of the spray segment, the moisture percentage peaks, and then decreases during the drying segment to reach the final moisture level. These figures provide the results of the pressure-drop analysis conducted on experimental data from runs 1 and 6. The pressure data, including the total pressure drop across the bed and distributor plate (P1–P2), filter bag pressure drop (P2–P3 or $\Delta P_{filter}$), distributor plate ($\Delta P_{plate}$), and fluidized bed ($\Delta P_{bed}$). During the initial spraying phase after powder charging, a small $\Delta P_{bed}$ and large $\Delta P_{filter}$ suggest substantial powder adherence to the filter bags. As the spraying progresses, $\Delta P_{bed}$ increases, indicating more powder incorporation into the spray zone.

For steady fluidization, it is desirable to maintain a consistent fluidization by having a steady pressure drop ratio $\Delta P_{plate}/\Delta P_{bed}$ of about 1.4. Comparing runs 1 and 6, steady fluidization was substantially achieved with pre-wetting and $\Delta P_{plate}/\Delta P_{bed}$ is about 1.5; the pressure drop ratio was higher and more variable without pre-wetting.

The mass data shown in FIGS. 9A and 9B compare the mass within the bed (calculated from $\Delta P_{bed}$ during the spray segment) against theoretical values for the total mass. The results emphasize the importance of having stable fluidization, especially during the binder spray segment of the process. Without pre-wetting, a significant fraction of the powder was being elutriated during the binder-spray segment; with pre-wetting, the bed mass approached the theoretical ideal by about halfway into the spray segment. Pre-wetting reduces the discrepancy between actual and theoretical masses, improving the efficiency of the spray flux and minimizing the holdup above the bed (e.g., on filter bags or fluidization chamber walls).

The fractional moisture analysis assumes that all the product moisture is retained in the fluidized bed, i.e., in the path of the binder spray-flux. This assumption implies that the material above the fluidized bed height (i.e., on filter bags or adhered to the fluidization chamber wall) does not interact with the binder spray. Comparing runs 1 and 6 in FIGS. 9A and 9B, run 6 has a larger initial moisture content due to its initial 10% wt/wt pre-wetting. Note that a significant portion of the pre-wet moisture evaporates in the charge transfer step when the powder is exposed to a large airflow from the charge transfer combined with pre-heated fluidization air in the product chamber. This "flash drying" behavior was quantified using the exit airflow and humidity data; however, there were uncertainties in these measurements, especially the humidity sensor time lag at high airflows. Depending on the initial pre-wetting (5% or 10% wt/wt) and the details of the charge transfer, the remaining moisture was in the range of about 2-8% wt/wt of the premix powder.

Referring back to Table 2, the table shows that run 6 reaches a maximum total moisture of 20% and a maximum bed moisture of 21.6%, while run 1 reaches 16.2% but a total bed moisture of 31%, then both ultimately achieve an end moisture of 9.5 and 11.3% at 32° C. (see Table 2, FIGS. 7A and 7B, and FIGS. 9A and 9B). However, the results of the Loss on Drying (LOD) analysis shown in Table 2, indicate similar water content for both runs (2.70% for run 6 and 2.8% for run 1). The disparity between LOD measurements and calculated end moisture content likely arises from multiple sources including uncertainty in the air flow and humidity sensors which accumulate over time in the mass balance calculation. This discrepancy is consistent with past reported results that showed that small errors in moisture balance using a calculated drying rate are cumulative and hence requires a normalization against the measured LOD and cannot be predicted using only a model.

Figures 10A, 10B, 10C, 10D:
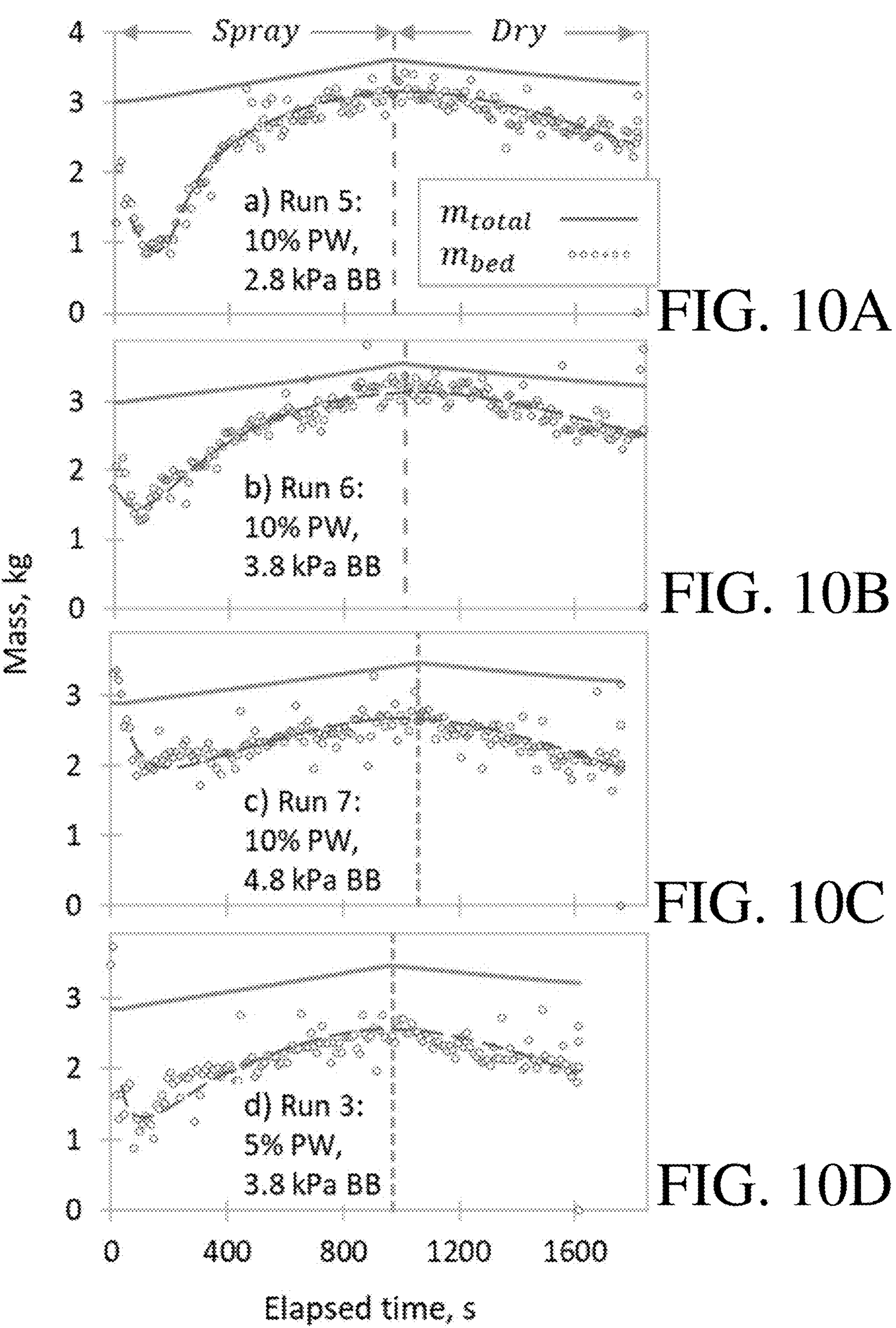
FIGS. 10A, 10B, 10C, and 10D are graphs of mass in kg vs. elapsed time for runs 3-7 providing a comparison of fluidized bed, $m_{bed}$, and total, $m_{total}$, mass by filter-bag blowback (BB) and pre-wetting (PW)

Filter bags serve multiple purposes, one of which is capturing the elutriated particles, especially in the presence of micronized powder. The filter bag cleaning blowback pressure is one other parameter that was assessed, according to the present disclosure. The pulsed blowback causes a momentary reversal of airflow across individual bags, dislodging accumulated particles in order to maintain efficient operation of the process with consistent product yield (see FIGS. 7A and 7B and FIGS. 10A, 10B, 10C, and 10D which are graphs of mass in kg vs. elapsed time for runs 3-7 providing a comparison of fluidized bed, $m_{bed}$, and total, $m_{total}$, mass by filter-bag blowback (BB) and pre-wetting (PW): FIGS. 10A, 10B, and 10C, respectively) all with 10% PW with increasing BB, and FIG. 10D providing results for 5% PW with intermediate BB.

FIGS. 10A-10D further examines $m_{bed}$ and to $m_{total}$ in three runs with the same formulation and process parameters but different blowback gauge pressures; run 5 at 2.8 bars (FIG. 10A), run 6 at 3.8 bars (FIG. 10B), and 7 at 4.8 bars (FIG. 10C). FIG. 10B shows that increasing the blowback pressure brings $m_{bed}$ closer to $m_{total}$ at the start of the spraying segment, resulting in a more stable powder amount in the spraying zone throughout the run. However, a larger pressure (FIG. 10C) led to increased powder adhesion to the walls, resulting in a diminished amount in the spraying zone overall. This result suggests that blowback pressure can be increased at the beginning of the run and then decreased as the run progresses, optimizing the granulation efficiency and powder distribution.

Samples from Fluid Bed Granulation runs were compared using size and shape analysis. Table 3 summarizes the results of the size and shape characterization from the DIA data (FIG. 1D), $d_g$ and $s_g$ are the geometric mean and the geometric standard deviation of the log normal size distribution, EFF*and FF*represent the stretched-exponential modes at the 63$^{rd}$ percentile. The data was analyzed at a grayscale threshold of 190 and a pixel scale of 0.4945 and the particles with a luminescence of over 130 were filtered out. The formulations across the runs remained consistent except run 8, which used a blend of 50% micronized APAP and 50% microcrystalline cellulose Avicel 102 as the excipient (see Table 2). The amount of binder added, and binder rate were also standardized, about 3% dry basis, except run 8 which had 4% dry basis HPC binder added as an 8% wt/wt solution at 70 g/min.

TABLE 3

Summary of DIA results based on filter blow-back (BB), pre-wetting (PW), and enthalpy balance (maximum bed moisture); % are wt/wt.

| Run | BB, bar | PW, % | Max bed moisture, % | $d_g$, μm | $s_g$ | EFF* | FF* |
|---|---|---|---|---|---|---|---|
| 1 | 3.8 | 0 | 31.0 | 239 | 1.76 | 0.82 | 0.74 |
| 2 | 2.8 | 5 | 22.6 | 204 | 1.51 | 0.87 | 0.80 |
| 3 | 3.8 | 5 | 21.6 | 193 | 1.46 | 0.87 | 0.80 |
| 4 | 4.8 | 5 | 21.0 | 193 | 1.45 | 0.86 | 0.78 |
| 5 | 2.8 | 10 | 21.8 | 182 | 1.50 | 0.90 | 0.83 |
| 6 | 3.8 | 10 | 21.6 | 173 | 1.42 | 0.88 | 0.81 |
| 7 | 4.8 | 10 | 22.0 | 184 | 1.42 | 0.85 | 0.78 |
| 8 | 3.8 | 10 | 30.8 | 238 | 1.53 | 0.86 | 0.78 |

The size distribution is represented as a volume-weighted Gaussian distribution with results presented using the mean area equivalent diameter and the geometric standard deviation. The irregularity or shape of the particles are presented as Form Factors (FF) and Elliptical Form Factors (EFF). The distributions of the shape factors are presented as a volume-weighted Weibull distribution, known to a person having ordinary skill in the art.

Figure 11:
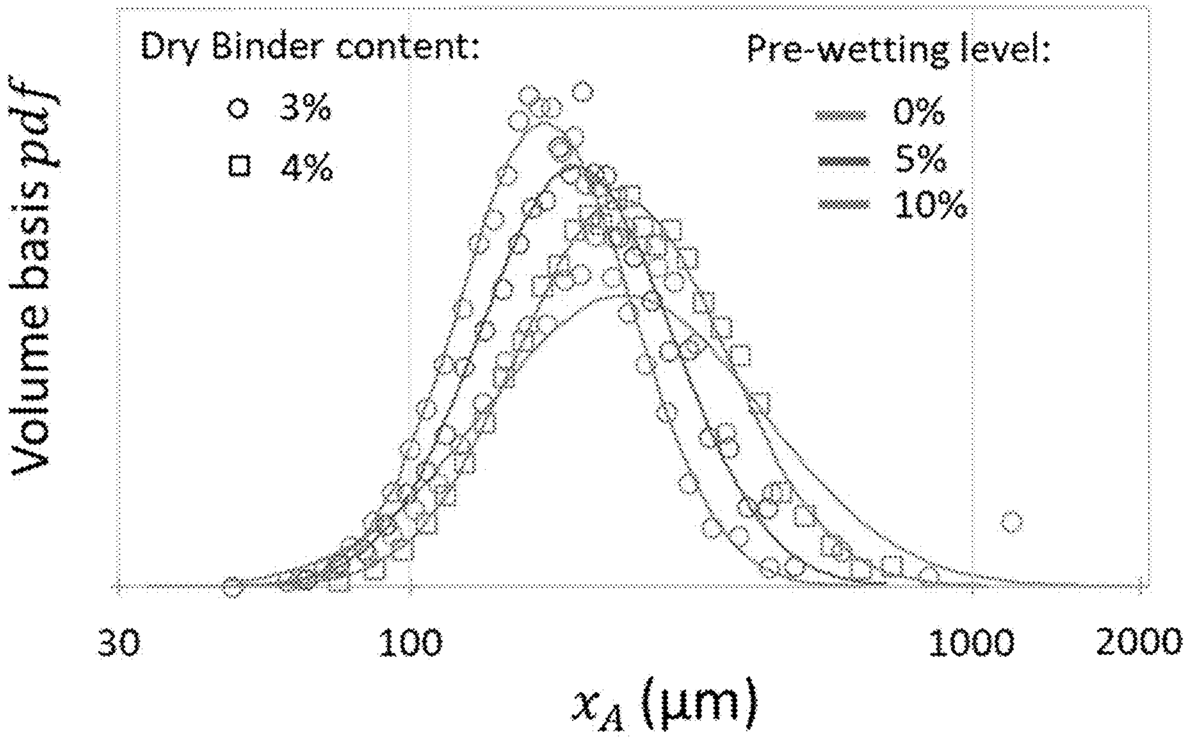
FIG. 11, is graph of volume probability density function (pdf) of particle size distribution obtained from DIA of runs at different pre-wetting levels.

The size distributions of runs 1, 3, 6, and 8 are shown in FIG. 11, which is graph of volume probability density function (pdf) of particle size distribution obtained from DIA of runs at different pre-wetting levels, showing the log-normal fit distribution of the samples highlighting the difference in granule size $d_g$ and size distribution $\sigma_g$ of runs with different pre-wetting levels. Run 1 had 0% pre-wetting, run 3 had 5% pre-wetting, run 6 had 10% pre-wetting, at 3% wt/wt dry binder basis, and run 8 had 10% pre-wetting at 4% dry binder basis. The overall size distributions overlap, however, it is apparent that pre-wetting influenced the mean and breadth of the size distribution of the granules.

Comparisons for all pairs using the Tukey-Kramer HSD test were conducted using JMP® (Version 16.0.0. SAS Institute Inc., Cary, NC, 1989-2021) across samples to compare the standard deviation of the log normal distributions of runs at 3% dry binder basis. The results indicated a significant impact of pre-wetting on granule uniformity with a decrease in standard deviation and size as pre-wetting level increases (Table 4). While blowback pressure did not exhibit a significant effect on granule size and size distribution, the data suggest that blowback optimization can lead to a narrower size distribution, especially when coupled with pre-wetting. Further research with a larger dataset is warranted to fully understand the effects of blowback pressure on the size distribution of the granules.

TABLE 4

Comparisons of the particle size geometric standard deviation of FBG runs with 3% dry binder basis at different pre-wetting (PW, % wt/wt) and blowback (BB) levels using the Tuckey-Kramer HSD test. The pairs column represents the levels being compared.

| Factor | levels compared | Difference | Std Err Diff | p-Value |
|---|---|---|---|---|
| PW % | (0, 10) | 0.311 | 0.0425 | 0.0041 |
| | (0, 5) | 0.286 | 0.0425 | 0.0056 |
| | (5, 10) | 0.0257 | 0.0301 | 0.6939 |
| BB, | (2.8, 3.8) | 0.0445 | 0.119 | 0.9277 |
| bar | (2.8, 4.8) | 0.0645 | 0.131 | 0.8785 |
| | (3.8, 4.8) | 0.109 | 0.119 | 0.6621 |

It should be noted that having a p-Value <0.01 is considered highly significant; <0.05 marginally significant. In this example the presence of pre-wetting (0,n) was highly significant; other pair-wise comparisons were insignificant.

Figures 12A, 12B, 12C:
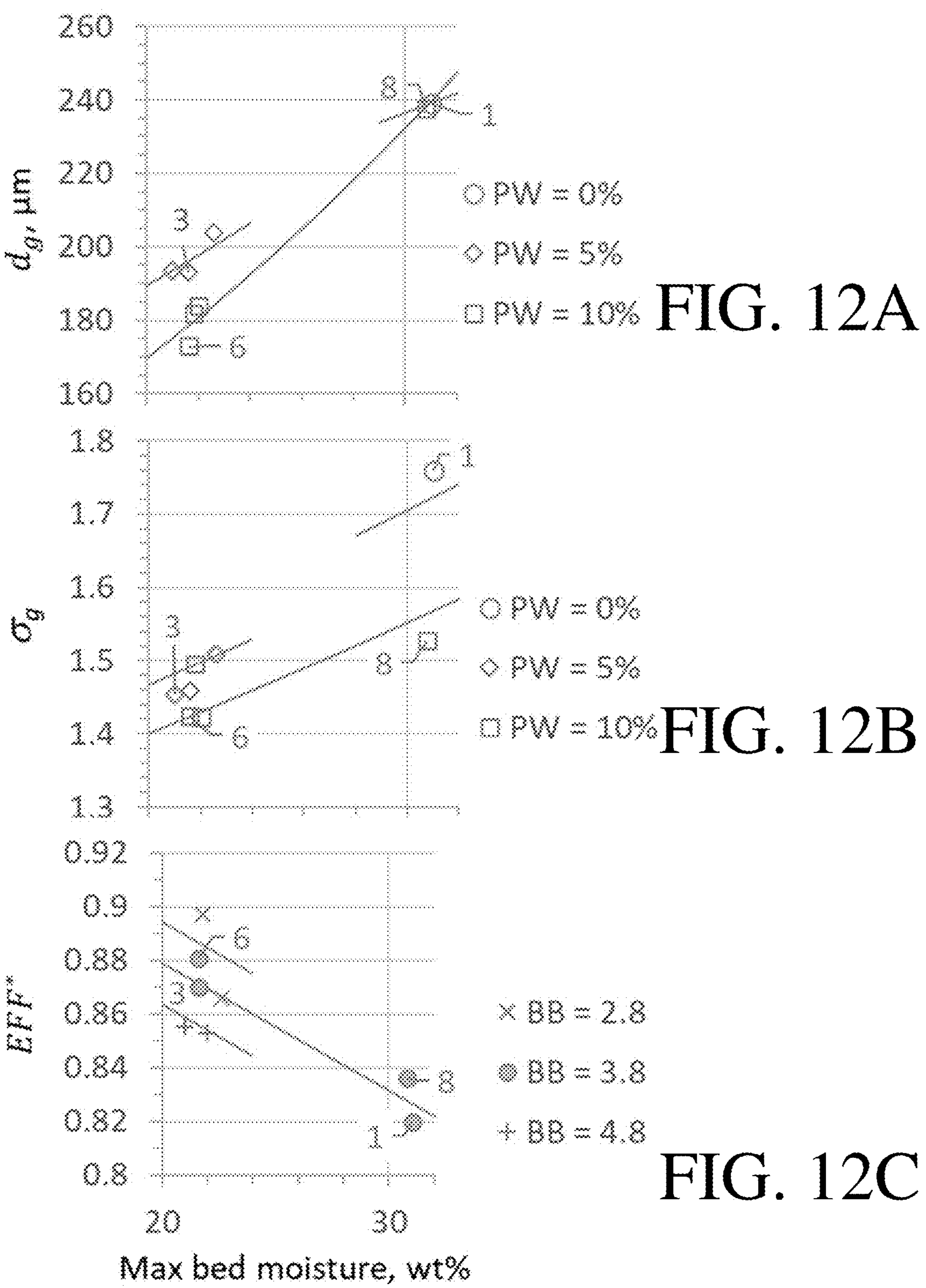
FIG. 12A, FIG. 12B, and FIG. 12C are graphs of granule growth (FIG. 12A), size distribution (FIG. 12B), and shape (FIG. 12C) as a function of maximum bed moisture.

Statistical analyses were performed to test the effects of processing on granule shape of the eight runs in this study (see Table 5 and FIGS. 12A-12C which are graphs of granule growth (FIG. 12A), size distribution (FIG. 12B), and shape (FIG. 12C) as a function of maximum bed moisture). Granule growth, $\ln(d_g)$, maximum bed moisture, pre-wetting, and blowback pressure were considered as factors in the analysis. Aspect ratio modes were similar over the range of conditions, i.e., $AR_{box}$*~0.7 with a standard deviation of 0.012. While samples had overlap in the shape distribution, the mode of the Elliptical Form Factor showed a statistically significant trend with granule growth and blowback. Pre-wetting had no significant effect on the shape distribution.

TABLE 5

Multiple regression analysis parameter estimates for size and shape factors shown in FIGS. 12A-12C. The EFF* model intercept was constrained to 1.0. MBM % is the maximum bed moisture.

| Characteristic, factor | | Estimate | Std Error | t Ratio | Prob > \|t\| |
|---|---|---|---|---|---|
| $\ln(d_g)$ | Intercept | 4.798 | 0.0584 | 82.17 | <.0001 |
| | MBM % | 0.025 | 0.0021 | 11.85 | 0.0003 |
| | PW % | −0.014 | 0.0028 | −4.86 | 0.0083 |
| | (MBM % - 24.1) × (PW % - 6.88) | 0.002 | 0.0005 | 3.83 | 0.0187 |
| $\ln(\sigma_g)$ | Intercept | 0.225 | 0.0758 | 2.96 | 0.0314 |
| | MBM % | 0.010 | 0.0027 | 3.78 | 0.0129 |
| | PW % | −0.009 | 0.0031 | −3.03 | 0.0292 |
| EFF* | MBM % | −0.004 | 0.0006 | −6.30 | 0.0007 |
| | BB/bar | −0.012 | 0.0040 | −2.91 | 0.0269 |

FIG. 12A shows a growth trend correlating with the maximum bed moisture content. While growth of the geometric mean size, $d_g$, was correlated with pre-wetting at lower bed moisture content, the effect of pre-wetting diminished with increasing bed moisture. In FIG. 12B, narrower size distributions, $\sigma_g$, were achieved with pre-wetting, suggesting a process strategy to improve product uniformity. FIG. 12C shows the effect of prewetting and blowback on shape, as quantified by the mode of the elliptical form factor, EFF*. This result suggests irregular growth in fluid-bed granulation; as the size increases, so does the shape irregularity.

Comparing run 8 with run 6, the formation of larger granules was observed with run 8 (see Table 3; FIGS. 11, 12A-12C). The key parameter difference was that run 8 incorporated a higher quantity of binder solution (4% vs. 3% dry binder basis, Table 2) and achieved a higher maximum bed moisture in the process. Comparing run 1 with runs 3 and 6, larger granules were formed in run 1; the key parameter difference was the lack of pre-wetting in run 1, leading to more elutriation and less mass in the fluidized zone (FIGS. 9A and 9B). The lower mass of powder in the bed resulted in an elevated bed moisture concentration and larger granule growth in run 1.

Those having ordinary skill in the art will recognize that numerous modifications can be made to the specific implementations described above. The implementations should not be limited to the particular limitations described. Other implementations may be possible.

The invention claimed is:

1. A fluidized bed granulation (FBG) system, comprising:

a feedstock vessel adapted to hold powder feedstock to be granulated;

a pre-wetting subsystem, wherein the feedstock is pre-wet in the pre-wetting subsystem to a predetermined % value;

a fluidization chamber;

an inlet coupled to the fluidization chamber and adapted to receive the pre-wet feedstock to be granulated;

a plenum coupled to the fluidization chamber by a distributor plate having slots through which a fluidization gas is passed to the fluidization chamber, said gas having a fluidization velocity including a fluidization direction;

an outlet compartment coupled to the fluidization chamber by a termination plate having one or more filter bags whereby gases are allowed to escape the fluidization chamber while the pre-wet feedstock is held back on surfaces of the one or more filter bags;

a liquid binder system adapted to introduce a liquid binder into the fluidization chamber through nozzles to spray the liquid binder in substantially same or opposite direction as the fluidization direction;

an outlet configured to eject granulated product with granules having a geometric mean and a geometric standard deviation;

a plurality of sensors adapted to inform a processor executing instructions maintained on a non-transitory memory, wherein the processor using a mass, energy, and fluidization balance model is adapted to optimize the FBG system to provide the granulated product having an optimized geometric mean for granule size at an optimized geometric standard deviation, wherein the ejected granules have a geometric granule size and shape distribution of between about 2.0 and about 1.0.

2. The FBG system of claim 1, wherein the gas is air.

3. The FBG system of claim 2, wherein the plurality of sensors include:

an inlet airflow sensor disposed in the plenum and adapted to provide a volumetric airflow signal ($\dot{V}_{in}$) corresponding to amount of air passing by the inlet airflow sensor;

a first relative humidity sensor disposed in the plenum and adapted to provide a first relative humidity signal ($RH_{air\_in}$) corresponding to a measure of relative humidity of air;

a first pressure sensor disposed in the plenum and adapted to provide a signal ($P_1$) corresponding to a measure of inlet pressure of air;

a temperature sensor ($T_{in}$) disposed in the plenum and adapted to provide a signal corresponding to a measure of inlet temperature of air;

a second pressure sensor disposed in the fluidization chamber near the termination plate adapted to provide a second pressure signal ($P_2$) corresponding to pressure at said location; and a mass sensor disposed in the liquid binder system and adapted to provide a signal ($\dot{m}_s$) corresponding to rate of mass of binder sprayed through the nozzles.

4. The FBG system of claim 3, wherein mass rate of air passing through the distributor plate from the plenum (inlet air) into the fluidization chamber is calculated based on:

$$\dot{m}_{air\_in} = \dot{V}_{in} \cdot \rho_{g\_in},$$

wherein $\rho_{g\_in}$ is the density of air at $T_{in}$ calculated based on:

$$\rho_{g\_in} = p / (R_{specific} \cdot (273 + T_{in})),$$

wherein p is air pressure in the plenum in units of atmospheres, $T_{in}$ is air temperature in in the plenum in units of degrees Celsius (° C.), and $$R_{specific} = 0.287 \text{ in units of kJ/(kg° } K.).$$

5. The FBG system of claim 4, wherein cumulative mass of water added to the FBG system at elapsed time t is calculated based on:

$$m_{w\_in}|_t = \sum_0^t (AH_{air\_in} \cdot \dot{m}_{air\_in} + (1 - B) \cdot \dot{m}_s)\Delta t,$$

wherein B is a percent by weight of binder solids to water content in the liquid binder, ⓜ $_{air\_in}$ is the mass and $AH_{air\_in}$ is the absolute humidity of the inlet air, respectively, calculated for each time increment, Δt, with the absolute humidity based on:

$$AH_{air\_in} = RH_{air\_in} \cdot P_{sat}(T)/(101.3 \cdot p_{in}),$$

wherein $RH_{air\_in}$ is fractional relative humidity measured with the associated sensor, $p_{in}$ is inlet air pressure in units of atmospheres measured as $P_1$, and $P_{sat}(T)$ is water vapor saturation pressure in air at temperature T (° C.) based on one of a plurality of approximation including:

$$P_{sat}(T) \approx 0.61078 \cdot \exp(17.27 \cdot T / (T + 237.3)).$$

6. The FBG system of claim 5, wherein cumulative mass of water removed from the granulation system at elapsed time t is calculated based on:

$$m_{w\_out}|_t = \sum_0^t (AH_{air\_out} \cdot \dot{m}_{air\_out})\Delta t,$$

wherein $\dot{m}_{air}$ out is the mass and $AH_{air\_out}$ is the absolute humidity of the outlet air calculated for each time increment, Δt, with the outlet mass flow based on:

$$\dot{m}_{air\_out} = \dot{m}_{air\_in} \cdot (1 - AH_{in}) / (1 - AH_{out}),$$

And the absolute humidity based on:

$$AH_{air\_out} = RH_{air\_out} \cdot P_{sat}(T) / (101.3 \cdot p_{out}),$$

wherein $RH_{air\_out}$ is the fractional relative humidity measured with the associated sensor, $p_{out}$ is the outlet air pressure in units of atmospheres, provided as $P_3$, $P_{sat}(T)$ is the water vapor saturation pressure defined by:

$$P_{sat}(T) \approx 0.61078 \cdot \exp(17.27 \cdot T / (T + 237.3)),$$

wherein mass evaporation rate is calculated based on:

$$\dot{m}_{evap} = \dot{m}_{air\_out} - \dot{m}_{air\_in}.$$

7. The FBG system of claim 6, wherein cumulative mass of water removed from the FBG system at elapsed time t is calculated based on a predictive energy balance, wherein $\dot{m}_{evap}$ is based on enthalpy balance, and $$\dot{m}_{air\_out} = \dot{m}_{air\_in} + \dot{m}_{evap}.$$

8. The FBG system of claim 4, wherein a pressure drop across the distributor plate, $\Delta P_{plate}$, is calibrated based on collecting pressure data with an otherwise empty fluidization chamber as a function of airflow and temperature expressed by:

$$\Delta P_{plate} = \rho_{g\_plate} U_s^2 / \left(2C_d^2 f^2\right),$$

Wherein $\rho_{g\_plate}$ is the air density evaluated using the pressure and temperature data in the close vicinity of the distributor plate, for example using the product temperature sensor just above the plate, f is fractional open area due to the slots of the distributor plate, $U_s$ is a measure of superficial velocity of air, $$U_s = \dot{m}_{air\_in} / (A \cdot \rho_{g\_plate}),$$

wherein A is the cross-sectional area of the fluidization chamber at the level of the distributor plate, and $C_d$ is the distributor plate discharge coefficient calculated based on:

$$C_d = C_{d,0} \cdot Re_{slot}^m,$$

Wherein $C_{d,0}$ and m are fit parameters modeled as a function of Reynolds Number of the gas flow through the distributor plate, wherein the Reynolds number is calculated based on:

$$Re_{slot} = \rho_{g\_plate} \cdot U_s \cdot w / \mu_{g\_plate},$$

wherein w is characteristic size (width, in units of length) of the openings in the distributor plate, and $\mu_{g\_plate}$ is dynamic viscosity of the gas evaluated at the temperature and pressure conditions evaluated in close proximity to the distributor plate.

9. The FBG system of claim 8, wherein actively-fluidized mass of material in the fluidization chamber ($m_{bed}$) is calculated based on:

$$m_{bed}|_t = \Delta P_{bed}|_t \cdot A / g,$$

$$\text{wherein } \Delta P_{bed}|_t = (P_1 - P_2)|_t - \Delta P_{plate}|_t,$$

wherein ($P_1$–$P_2$) It is the measured pressure drop at elapsed time t, $\Delta P_{plate}|_t$ is the calculated pressure drop across the distributor plate and elapsed time t, A represents cross-sectional area of the fluidization chamber at the height of the fluidized bed, and g is gravitational acceleration.

10. The FBG system of claim 9, wherein instantaneous mass of moisture associated with the fluidized product at elapsed time t, and the total mass in the fluidization chamber, respectively, are calculated based on:

$$m_{w\_bed}|_t = m_{w\_in}|_t - m_{w\_out}|_t,$$

-continued $$m_{total}|_t = m_p + m_{w\_bed}|_t + m_{bs}|_t,$$

wherein $m_p$ is mass of the pre-wet feedstock, and $m_{bs}$ is mass of binder solids calculated as:

$$m_{bs}|_t = \sum_0^t (B \cdot \dot{m}_s)\Delta t.$$

11. The FBG system of claim 10, wherein the processor optimizes $m_{bed}/m_{total}$ over course of process elapsed cycle time, t, to be below a predetermined threshold, based on deterministic values of % pre-wetting, $\dot{V}_{in}$, $RH_{air\_in}$, $P_1$, $T_{in}$, B, and $\dot{m}_s$, each chosen within an associated predetermined range of values, wherein $\tau_0$ is time at start of the liquid binder addition and $\tau_1$ is time at end of the liquid binder addition, with $\tau_n$ representing time at fractional binder addition, n, wherein $$\left(\sum_{\tau_n}^{\tau_1} (m_{bed} / m_{total})\Delta t / (\tau_1 - \tau_n)\right) > \text{Target}_n$$

for time range of $\tau_n \le t \le \tau_1$, where $\text{Target}_n$ is one of 0.5, 0.6, 0.7, 0.8, or 0.9 for $\tau_n$ of one of 0.25 or 0.5.

12. The FBG system of claim 1, wherein the feedstock includes micronized active pharmaceutical ingredient (API) formulation comprising one or more of about 20-80% by weight of micronized API, 30-70% by weight of micronized API, or 40-60% by weight of micronized API, and an excipient core.

13. The FBG system of claim 12, wherein the excipient core is adapted to absorb water.

14. The FBG system of claim 13, wherein the excipient core having a mean size between about 80 to about 150 μm.

15. The FBG system of claim 12, wherein the excipient core includes microcrystalline cellulose (MCC).

16. The FBG system of claim 15, wherein the MCC is one or more of MCC PH102 or MCC PH302.

* * * * *